United States Patent [19]
Tümer

[11] Patent Number: 5,943,388
[45] Date of Patent: Aug. 24, 1999

[54] RADIATION DETECTOR AND NON-DESTRUCTIVE INSPECTION

[75] Inventor: Tümay O. Tümer, Riverside, Calif.

[73] Assignee: Nova R & D, Inc., Riverside, Calif.

[21] Appl. No.: 08/899,633

[22] Filed: Jul. 24, 1997

Related U.S. Application Data

[60] Provisional application No. 60/023,319, Jul. 30, 1996.

[51] Int. Cl.[6] .................................................... H05G 1/64
[52] U.S. Cl. ........................................ 378/98.9; 378/98.11
[58] Field of Search .................................... 378/98.9, 157, 378/57, 4, 9, 5, 21, 98.11, 98.12

[56] References Cited

U.S. PATENT DOCUMENTS

| | | | |
|---|---|---|---|
| 3,848,130 | 11/1974 | Macovski | 378/157 X |
| 4,029,963 | 6/1977 | Alvarez et al. | 378/98.9 X |
| 4,479,231 | 10/1984 | Haendle et al. | 378/98.9 |
| 4,722,096 | 1/1988 | Dietrich et al. | 378/57 |
| 5,060,249 | 10/1991 | Eisen et al. | 378/57 |
| 5,091,924 | 2/1992 | Bermbach et al. | 378/57 |
| 5,125,015 | 6/1992 | Shimoni et al. | 378/57 X |

*Primary Examiner*—David P. Porta
*Attorney, Agent, or Firm*—Snider & Chao, LLP

[57] ABSTRACT

A CdZnTe solid state detector application specific integrated circuit is used for detection of radiation. The chip and circuitry is under control of a main computer which provides control signals to a solid state detector chip module which provides threshold level and count information to the computer for processing into an image. The processed image may be a tomographic image and/or a multispectral image wherein image colors represent different energy bands of received x-rays. The information used from different energy band images is used to identify different materials contained in an object being scanned.

51 Claims, 15 Drawing Sheets

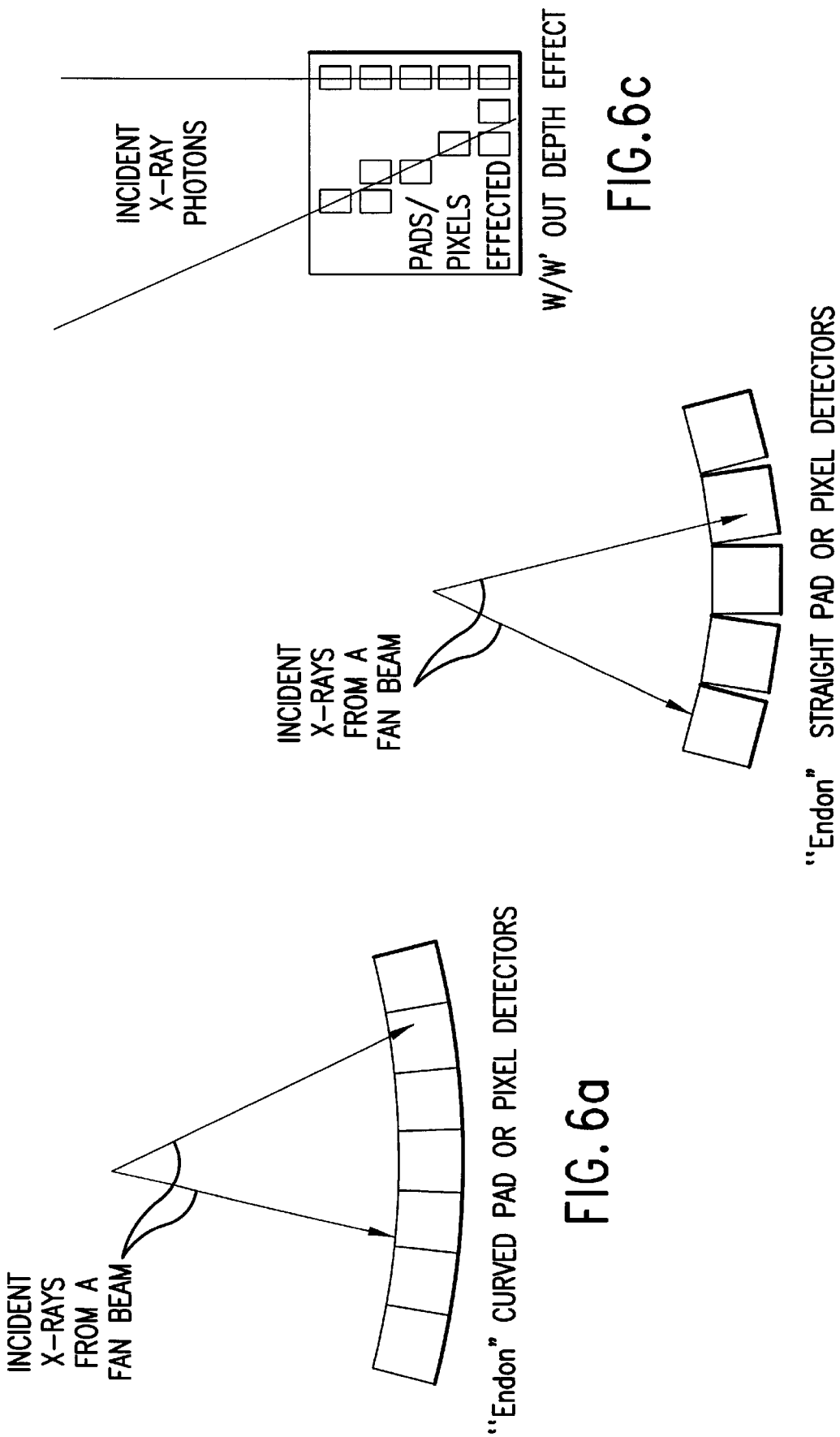

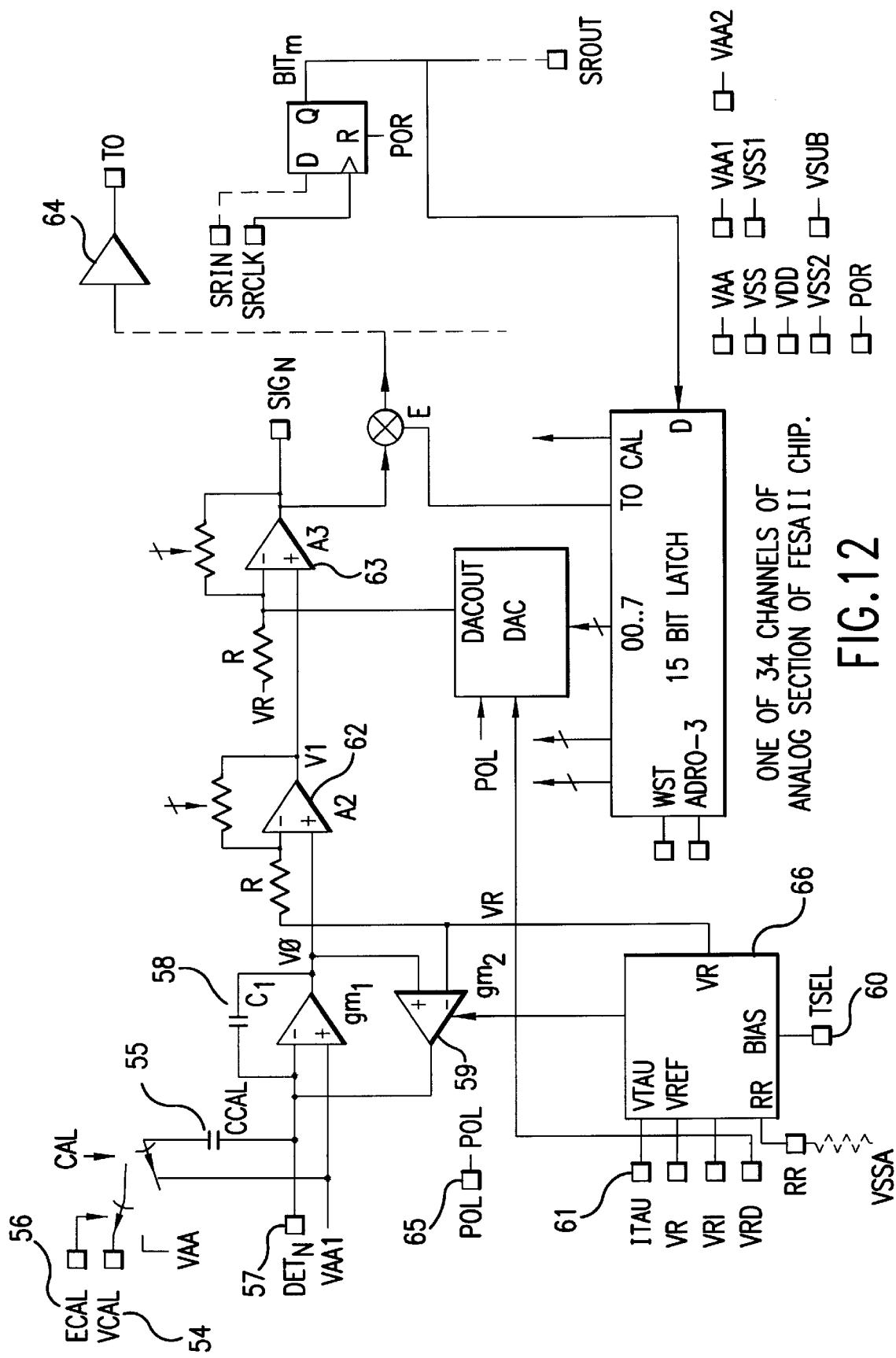
FIG. 12 ONE OF 34 CHANNELS OF ANALOG SECTION OF FESAII CHIP.

RADIATION DETECTOR AND NON-DESTRUCTIVE INSPECTION

This application claims benefit of provisional application Ser. No. 60/023,319 filed Jul. 30, 1996.

INTRODUCTION

This invention was made with Government support under contract DAA21-93-C-1014 awarded by the Department of the Army—U.S. Army Tank-Automotive and Armaments Command—Armament Research, Development and Engineering Center, Picatinny Arsenal, N.J. 07806-5000. The Government has certain rights in the invention.

BACKGROUND OF THE INVENTION

1. Field of the Invention

This invention is in the field of automatic baggage inspection systems, agricultural product, explosive and narcotic drug inspection systems, bone densitometry, and detectors and Application Specific Integrated Circuits (ASIC) chips used for such inspection systems. The field of the invention further includes display and imaging systems which are responsive to intensity and energy spectrum of x-rays received, when analyzed for intensity level.

2. The Prior Art

X-ray detection for baggage scanning, bone densitometry and the like are known in the art. It is further known that CdZnTe can be used to detect x-rays. However, use of CdZnTe pad or pixel detectors or in general position sensitive solid state detectors in combination with circuitry for producing an image which is a function of the energy of received x-rays is not.

BRIEF DESCRIPTION OF THE INVENTION

A first embodiment of this invention comprises an x-ray imaging apparatus comprising a source of x-rays, a plurality of x-ray detectors with one or more rows of pixels or pads wherein each detector or pad or pixel has an output which comprises at least two threshold data wherein each threshold data is representative of an x-ray energy level received, a display means responsive to the plurality of x-ray detectors threshold data for producing images for different energy bands, and wherein the display means includes a computer for generating a scan control for the display screen. In this apparatus, the source of x-rays may be a point source of x-rays. In this apparatus, there also may be a means for movement between the source of x-rays and the object to be detected, wherein a tomographic x-ray image may be obtained after processing of data and displaying means.

Still further, in this apparatus the x-ray detectors may be constructed from position sensitive solid state detectors made from materials such as CdTe, CdZnTe, Selenium, $PbI_2$, GaAs, AlGaAs, InGaAs, HgBrI, $HgI_2$, GaAs and silicon.

Still further, in this embodiment, there also may be incorporated a means for adjusting the threshold data levels to compensate for differences in output levels of different x-ray detector pads or pixels.

In this inspection system, a means for placing a plurality of x-ray sources and turning said radiation source on and off may be used for generating a tomographic image.

This apparatus may further include a plurality of long detector arms placed surrounding a conveyer belt upon which an object to be detected is carried. These detector arms may be straight or curved around the conveyer belt carrying the object under investigation. These detector arms may also be positioned in the form of a spiral or a double helix where the detectors lie on one helix and the x-ray sources on the opposite helix. The helical formation may be especially useful for fast scanning.

This apparatus further includes point x-ray sources separated at regular or irregular distances from each other and placed opposite to the x-ray detector arms in straight, curved or spiral formations to produce a partial or complete coverage of the object and to generate tomographic images.

In the first embodiment of the invention, an x-ray detector is provided which comprises in combination a plurality of detector pads or pixels for producing output pulses proportional to the energy levels of a x-ray radiation, output pulse shaping means for generating output pulses connected to each of said pixels or pads; a plurality of comparator discriminators for producing outputs when said output pulse exceeds a threshold level of each comparator discriminator connected to said output pulse shaping means, a counter connected to each comparator discriminator for counting a number of pulses in excess of said threshold level, registers for accumulating a count of said pulses from each of said counters, and a means for reading the count of said register onto a bus. This embodiment is depicted in FIGS. 2 and 5.

The first embodiment may further comprise a computer control means for providing load and reset commands for computer registers, at least one shift register and switch control for turning on and off x-ray detectors wherein said at least one shift register provides a control signal for said switch control, and a data readout shift register. In this embodiment the means for turning on and off may be a control switch between the input pads of the readout electronics and preamplifiers or between preamplifiers and shaper amplifiers or shaper amplifiers and the comparators.

Still further, in this embodiment, the counter outputs may be stored into registers so that counters can continue to count immediately after storage into said registers without waiting for readout of the registers to be completed or counters read out directly without using registers.

Still further in this embodiment, there may be a means for externally turning off any channel in case said any channel becomes noisy or is otherwise not to be used.

In this embodiment, there may also be a means for adjusting channel-to-channel offset and gain variation for each amplifier, which, among other possibilities, comprises one or more digital to analog converter(s) placed at each amplifier.

In this embodiment, there may also be means for adjusting channel-to-channel variations of the comparator threshold levels, which, among other possibilities, comprises one or more digital to analog converter(s) placed at each comparator.

Still further in this embodiment, there may be a counter overflow detection means associated with each counter.

Still further in this embodiment, the position sensitive solid state pixels or pad detectors may be constructed from materials such as CdTe, CdZnTe, GaAs, selenium, silicon, $PbI_2$ AlGaAs, InGaAs, HgBrI or $HgI_2$.

Still further in this embodiment, there may be a means for adjusting threshold data levels to compensate for differences in output of different x-ray detectors pads or pixels.

Still further in this embodiment, the detectors, pixels or pads may be summed or subtracted from each other in any combination.

Still further in this embodiment, comparators may be replaced by analog to digital convertors. The output of analog to digital convertors, may be used to increment counters or memory locations.

In another embodiment, counters can be replaced by charge integrators which may be used to produce analog output instead of digital output for each energy band.

In a second embodiment, there is provided an ENDON x-ray detector comprising a plurality of detector pads or pixels for producing output pulses proportional to energy levels of x-rays received, wherein the detectors are located so that the deeper the position of the pixel or pad from a direction of x-ray incident radiation, the higher the energy of penetrating photons received is, a pulse shaping means connected to each detector, a counter connected to each pulse shaping means for counting a number of pulses generated by said pulse shaping means, a register connected to each counter, and a means for reading a count of said registers onto a bus or the charge or current produced at each pad due to x-rays interacting at that depth.

The ENDON detector may also comprise at least one shift register and switch controls for turning on and off x-ray detectors wherein said at least one shift register provides a control signal for said switch controls.

The ENDON x-ray detector may also include detector pads which are constructed from a material such as CdTe, CdZnTe, GaAs, selenium, silicon, $PbI_2$ AlGaAs, InGaAs, HgBrI or $HgI_2$.

The ENDON detector may further comprise an analog and/or digital data readout shift register for controlling data readout. It may also include means to digitize the charge or current signal.

The ENDON detector may also utilize a detector pad for producing an output pulse proportional to a quantum of energy wherein the detectors are physically arranged to form a two-dimensional array of pads or pixels which provide a position sensitive solid state detector. In this embodiment, x-rays which pass deeper into the detector and through a plurality of detector elements have higher energy. Therefore, detector pads which are further away from to the direction of the incident x-ray photons observe higher energy band photons. In this embodiment it is the location of the pixels or pads which determine energy band, not measurement of the level of energy deposited by individual particles detected by a particular pad.

In this type of detector, the detector may be a charge or current type or photon counting type position sensitive solid state detector with multi-spectral imaging where x-rays are incident to a narrow edge, and wherein x-rays pass through a plurality of detectors thereby indicating their energy level as a function of the number of detectors traversed. The charge or current or number of events counted at each pixel or pad determines the intensity or number of the photons in that energy band corresponding to the position of the pad or pixel with respect to the incident x-ray direction.

SUMMARY

Features

1. Linear pixel or pad array with two, three, four or more rows of pixels or pads with x-rays incident onto the side opposite to the pixels or pads, same side as pixels or pads or from the sides of the detector.

2. Using solid state room temperature position sensitive detectors for detecting photons and their energy to produce scanned images.

3. Energy resolved or multi-spectral imaging (separate images formed for different energy bands) in two-dimension, three-dimension or tomography.

4. Reading out pixel or pad detector arrays with an ASIC chip which contains two or more channels (each pixel or pad is readout by a single channel built into the ASIC chip).

5. A fast ASIC readout chip to produce a signal proportional to the energy of the incident photon at each channel independently at full speed.

6. A quick resetting front end amplifier that does not need external reset signal (in combination of the other functions).

7. Two or more comparator/discriminators to separate the signal at each channel into different 2 or more energy bands. The energy bands can coincide, are separated or overlap each other.

8. Count each comparator/discriminator output (each energy band) by separate and independent counters.

9. Connect counter contents to one or more outputs through a multiplex system.

10. Store the counter outputs into registers if necessary so that counters can start counting immediately without waiting for the reading out of data to be completed.

11. Stop counters and delay readout or delay storing into registers until the counters are settled.

12. The ASIC chip is daisy chainable such that several chip outputs can be connected to one bus and read out serially.

13. A selectable internal or external clock signal is used to run the digital control circuitry that can sequence the multiplexing circuits and data output rate.

14. The chip accepts either positive or negative charge input.

15. It is externally possible to turn on or off any channel in case one or more channels become noisy or not used.

16. The amplifier offset and gain variations from channel to channel are compensated by digital to analog converters (DACs) placed at each relevant amplifier.

17. The comparator level variations from channel to channel are compensated by digital to analog converters (DACS) placed at each comparator.

18. There are other external signals in addition to channel and test inputs to control the ASIC chip such as to cause it to start, input level (negative or positive charge) select, step, switch between different outputs, change readout or function modes, set different integration times, set channels to on or off individually, set DAC levels for each amplifier and comparator adjustment, stop, reset and any other signals that may be necessary for controlling the chip.

19. The ASIC chip generates control signals other than the analog and/or digital signal output such as chip ready, channel change acknowledge, data ready, channel address (if necessary), counter overflow, and readout complete as well any other necessary control signals for control of the chip and daisy chaining.

20. There is a test input to each channel for testing the ASIC chip without need to connect the inputs to a detector or pulse generator individually and extra test channels one at the top and one at the bottom of the column of channels.

21. Input level to digital chip (comparators) is measured and signaled if reaches maximum level.

22. Overflow of each counter can be detected and reported out.

23. The inputs are DC or AC coupled depending on the application. DC dark currents coming into the inputs of both the analog and digital chips can effect performance if too excessive. On board AC coupling to the inputs of both the analog and/or digital chips can be made.

24. A variation to the above detector described in item #1 is a pulse or current type "endon" detector with multi-spectral imaging where the x-rays are incident onto one of the narrow edges. Two-dimensional pads or pixels with same or varying sizes and pitch are fabricated on one or both largest area sides of a position sensitive solid state detector. The energy band information is obtained by counting the photons that penetrate and interact inside the detector substrate at the voxel formed by each pad or pixel. The deeper the position of the pad or pixel from the direction of the incident x-ray the higher the energy of the penetrating photons and the higher the energy band of the counts that pad or pixel produces. The pitch of the pads or pixel can be fabricated $\geq 10$ micron size. The detector voxel width is equal to the thickness of the detectors and it can be $\geq 100$ micron thick.

25. Same as item #24 but instead of using the detector in the counting mode it is used in the current mode. The output from each pad or pixel is charge current proportional to the number of photons interacting at the depth of the pad or pixel. The energy band information obtained is similar to item #23.

26. Multiple staggered arrays can be used to eliminate dead space in between detectors if they cannot be built abutable. Several detectors can also be placed side by side with pad or pixel positions accurately matching to effectively increase the detector thickness and thus the data rate.

27. The detectors are fabricated with the edge the x-rays incident on and also the pads or pixels in the form of an arc with radius equal to the distance from the x-ray source focal spot to the detector edge to eliminated depth effect due to the fan beam. Or the individual straight pad or pixel detectors can be mounted inclined towards the x-ray beam direction such that the photons incident at the center of the detector edge are normal to the detector edge. In this geometry the length of the detector edge where the x-rays are incident on must be long enough that the photons entering at the corners do not miss most of the voxel at the deepest penetration depths possible.

28. The detector width and the pad or pixel pitch determines the spatial resolution required and not the collection depth. Collection depth is set to the maximum depth the highest energy x-ray photons are expected to penetrate.

29. Two detector arrays placed perpendicular to each other and scanned in both the x and y directions can allow high position resolution in both directions.

30. A mixed signal ASIC readout chip similar to the ASIC chip discussed in items #4 to #23 working in the current mode.

31. It integrates input charge from a pixel or pad into an electric current or voltage signal.

32. It stores this signal if necessary.

33. It multiplexes signals from different channels to a single or multiple outputs.

34. It converts current signals to voltage before connecting them to the output if necessary.

35. It digitizes the signals with analog to digital converter (s) (ADC), multiplex and connect the digital number corresponding to the signal level to the output.

36. A selectable internal or external clock signal is used to run the digital control circuitry that can sequence the multiplexing circuits and data output rate. It can also control the ADC(s).

37. The chip also has provision to accept either positive or negative charge input.

38. The chip also has provision to turn any channel on or off in case any channel becomes noisy or not used.

39. The amplifier offset and gain variations from channel to channel can be compensated by digital to analog converters (DACs) placed at each relevant amplifier.

40. There is a test input to each channel for testing the ASIC chip without need to connect the inputs to a detector or signal generator individually. Extra test channels placed one at the top and one at the bottom of the column of channels.

41. There can also be other external signals in addition to channel and test inputs to control the current mode ASIC chip such as to cause it to start, input level (negative or positive charge) select, step, switch between different outputs, change readout or function modes, set different integration times, set channels to on or off individually, set DAC levels for each amplifier adjustment, stop, reset and any other signals that may be necessary for controlling the chip.

42. The ASIC chip can also generate control signals other than the analog and/or digital signal output such as chip ready, channel change acknowledge, data ready, channel address (if necessary), and readout complete as well as any other necessary control signals for control of the chip and daisy chaining.

43. The ASIC chip is made daisy chainable such that several chip outputs can be connected to one bus and read out serially.

44. The detectors are mounted onto ceramic carriers or printed circuit boards. The ASIC readout chips are also mounted onto ceramic carriers or printed circuit boards same as the one detector is mounted or different. The mounted chip is then placed very close to the detector and the two is then wire bonded together and electrically connected. Similarly other detectors and ASIC chips are mounted and abutted to each other in pairs, triples, or more units, all on a single printed circuit mother board. The mother boards can be abutted to produce a continuous detector arm that forms a straight or curved surface (with straight sections due to the straight flat mother boards). The curved surface is more likely to be in the form of an arc with radius about equal to the distance of the x-ray source focal spot to the detector surface.

45. The long linear detector arms (straight or curved into an arc) are placed surrounding the conveyer belt or object completely. Each arm can cover an angle of 30°, 60°, 90°, 120°, 150°, 180°, 210°, 240° or 270°.

46. Point x-ray sources separated at regular distance from each other placed opposite to the x-ray detector arms to produce complete coverage of the object and to generate a tomographic image. The x-ray sources can be placed on an arc.

47. Single x-ray source facing a detector array arm that moves up and down or side to side during a scan to produce complete coverage of the object and to generate a tomographic image. The single x-ray source can be moved up and down or side to side on an arc with radius about equal to the distance of the x-ray source focal spot to the detector surface. Two x-ray sources displaced from each other that move up and down or side to side traveling opposite in direction to each other to increase scan rate.

ADVANTAGES

1. Direct conversion, photon counting, linear solid state detectors can produce images from two or more energy bands directly from a single detector substrate without using separate detectors, absorbers, filters, etc.

2. A single solid state linear detector array is easier to align then present two detector systems placed on top of each other.

3. Using two or more rows of linear pixel or pad arrays allows faster data acquisition, higher count rate thus statistically better images, wider image area, higher efficiency, etc.

4. A single solid state linear detector array is smaller in size and can lead to compact sensor systems. A single detector array is cost effective compared to building two or more sensor arrays.

5. The energy resolution of the solid state detector can be much better than the scintillator based detectors thus allowing much improved and sharper cut between the (2 or more) energy bands.

6. A solid state direct conversion detector can have large thickness as the applied electric field through the bias voltage channel the electron-hole pairs directly to the pixels or pads and the diffusion of charge into adjacent pixels or pads as in light producing scintillators is prevented. Therefore, large thickness detectors can be used allowing high photon absorption efficiency without effecting image quality. High photon absorption efficiency in turn increases imaging speed and/or improves photon counting statistics.

7. Single detector array also has much reduced back scatter photon background as the material under the detector can be made thin and from low Z material. The present detector arrays separated by a metal or high Z layer for separation of energies into two energy bands may have large back scattered background level.

8. The developed mixed signal multichannel ASIC readout chip for the developed linear solid state pixel or pad detector arrays decreases the cost and real estate required if discrete or single channel readout electronics is used. This allows large detector arrays to be manufactured without costly large readout electronics.

9. The mixed signal multichannel ASIC readout chip is developed to have completely independent channels to increase throughput (count rate per channel) which is essential for high speed scanning application.

10. Each channel of the mixed signal multichannel ASIC readout chip has low noise front end charge sensitive amplifier with self resetting capability for fast high energy resolution imaging.

11. The outputs of the charge sensitive amplifiers are amplified. The offset of each amplifier is adjusted to be similar for each channel using DACs which are externally set by a computer. This allows uniform response for all the channels.

12. The analog section of the ASIC chip is built on a separate substrate compared to the digital section including the comparators so that the activity in the digital section has less chance of causing interference in the high sensitivity analog front end section. This reduces noise levels in the analog chip and thus improves energy resolution.

13. The output of the analog chip is ultrasonic wire bonded to the corresponding inputs of the digital chip for close mounting that saves real estate on the electronics board or the ceramic carrier.

14. Each input of the digital chip go directly into 2 or more comparator/discriminators, which separate the input signal into different energy bands directly without need to go through analog-to-digital converters or other circuits.

15. The threshold variations from comparator/discriminator to comparator/discriminator on the chip is adjusted to be similar using a DAC per comparator/discriminator. This is a major problem of non-uniformity together with the amplifier offset variations due to fabrication differences during manufacture. This adjustment improves the uniformity of the ASIC chip's response.

16. Input to the two or more comparator/discriminators per channel or output of each comparator/discriminator goes through a gate which can be closed or opened to control the counting of the photons incident onto the detector. These gates are also associated with delays so that readout does not start until the last count ripples through the counter. This allows accurate counting without the problem of misread counter contents. It also allows the use of ripple counters which occupies about half the real estate compared to more sophisticated synchronous counters.

17. Outputs of each comparator/discriminator is counted by a 2 or more bit ripple or synchronous counter. This allows each photon in each selected energy band to be counted independently and in parallel. This allows to achieve fast counting rates per channel (per detector pixel or pad).

18. Outputs of the counters can be stored on registers to read out while the counters are reset and start counting immediately. This is required if nearly zero dead time or 100% duty factor for counting is desired.

19. The outputs of the counters or registers are connected to an internal bus and multiplexed so that the number of ASIC chip outputs are minimized. External signals are used to control the internal bus and the multiplexer.

20. The outputs and control signals are made so that they can be daisy chained to enable serial readout capability to reduce external electronics and lower cost and real estate.

21. A test and calibration input is built into the analog chip that is coupled to every input. This enables the testing and calibration of the ASIC chip without need to connect a source into every input.

22. Each channel has turn on and turn off capability built in. Computer supplies the necessary control signals externally. This function is very useful to turn off channels that have problem, counting continuously or not used.

23. To sense if input to digital chip (comparators) reaches maximum level. The analog chip output can be pulses, ground or high level. The pulse output and high (or ground depending on the polarity) level when there are no signals coming through are expected legitimate response. If the output of the amplifier saturates at ground (or high) level opposite to normal no signal condition then to the comparator it looks like the high (or ground) level and the counting stops. One does not know whether there are no signal or the signal has hit the maximum level and saturated the amplifiers. It is important to sense if input to digital chip (comparators) reaches maximum level.

24. Overflow of each counter is detected. It is important to know if counters have overflowed or not as it effects the actual number of x-ray photons received. There are several ways this can be done. 1. Stop counting when the counter hits maximum counts, this effects data as the actual number of counts are lost, 2. Keep on counting (counter zeros and starts a new count cycle) but keep a second counter which counts the number of overflows, 3. Increase the number of counter bits so that the counter overflow range is well above normal working range, 4. Increase the counter range by dropping lower level bits so that counter size (number of bits is not changed), this lowers the resolution, 5. Raise a flag when a counter has overflowed, and 6. Carefully study data with nearest neighbors to determine if there was an overflow and add the full counts to the number to correct for the overflow.

25. The inputs are DC or AC coupled depending on the application. DC dark currents coming into the inputs of both the analog and digital chips can effect performance if too excessive. On board AC coupling to the inputs of both the analog and/or digital chips can be made.

26. A variation to the above detector described in item #1 is a pulse or current type "endon" detector with multi-spectral imaging where the x-rays are incident onto one of the narrow edges. The advantages of this technique is to use silicon or other low atomic number (Z) detector with significant thickness. Such detectors can have fast electron collection times and can facilitate the development of faster detectors to achieve higher counting rates compared to the CdZnTe type of high Z detectors discussed above. Also the energy band separation for multi-spectral imaging can be achieved by the depth of the interaction and not the pulse height. Therefore, it is not necessary to use high Z material for photoelectric effect. Low Z materials such as silicon can be used where the most common interaction is the Compton scatter for the x-ray energies of interest here. It is also straight forward to increase the depth of the detector to achieve nearly 100% efficiency for the maximum energy of the x-ray photons incident on the detector.

27. The "endon" type detectors can also be used in the current mode and not pulse counting mode. In current mode count rate is no longer a problem and very high x-rays fluxes can be used. The detector also separates energy bands of the incident x-rays without using pulse height information. Therefore, high energy resolution is no longer a necessity. However, it is still important to use low noise amplifiers, integrators and other circuits to achieve excellent signal-to-noise ratio.

28. Multiple staggered arrays can be used to eliminate dead space in between detectors if they cannot be built abutable. This is important as to achieve higher quality pads and pixels the detectors normally need a guard ring all around the perimeter of the detector with its width equal or larger than the thickness of the detector. This can not allow abutable detectors unless the pad or pixel pitch is much larger than the detector thickness. Therefore, staggering the detectors so that there are no dead spaces in between individual detectors is important. Several detectors can also be placed side by side to effectively increase the detector thickness and thus data rate. This is important for improving the image quality.

29. The detectors can be fabricated with the edge the x-rays incident on and also the pads or pixels in the form of an arc with radius equal to the distance from the x-ray source focal spot to the detector edge to eliminated depth effect due to the fan beam. Or the individual straight pad or pixel detectors can be mounted inclined towards the x-ray beam direction such that the photons incident at the center of the detector edge are normal to the detector edge. This is important to reduce the depth effect. If the photons are entering a detector with large depth at an angle the photon can penetrate into another pad or pixel that is not aligned with the top pad or pixel which can effect the quality of the image as shown in FIG. 6c.

30. The detector width and the pad or pixel pitch determines the spatial resolution required and not the collection depth. Collection depth is set to the maximum depth the highest energy x-ray photons are expected to penetrate. This allows longer detectors depths such that the maximum x-ray energies used have nearly 100% detection efficiency.

31. Two detector arrays placed perpendicular to each other and scanned in both the x and y directions can allow high position resolution in both directions. This is important if higher position resolution is required than achievable with the minimum possible detector thickness.

32. A current mode mixed signal ASIC readout chip. The ASIC chip described above which is used for pulse counting applications can not be used in current mode imaging. Therefore, another ASIC chip similar in function to the pulse mode ASIC chip but working in the current mode is necessary.

33. This ASIC chip integrates input charge from a pixel or pad into an electric current or voltage signal. The charge generated by x-rays that are incident onto the detector in very high rates cannot be counted individually. However, the charge generated can be integrated and used as a signal proportional to the x-ray photon rate to form the image. The charge current by itself or after converted to a voltage pulse can be digitized by an ADC and converted to a digital signal.

34. A selectable internal or external clock signal is used to run the digital control circuitry that can sequence the multiplexing circuits and data output rate. It can also control the ADC(s). Internal clocks are always preferred to reduce electronics. However, provision for an external clock is important in case required.

35. The chip also has provision to accept either positive or negative charge input. This important if holes are collected instead of electrons to generate the signal.

36. The chip also has provision to turn any channel on or off in case any channel becomes noisy or not used. This is important if one or more channels develop problems or are not used. This feature allows those channels to be turned off while the rest of the chip functions normally. This can eliminate the need to turn off a whole chip because of a single bad channel. Unused channels can be noise sources and turning them off can be an important safety feature.

37. The amplifier offset and gain variations from channel to channel can be compensated by digital to analog converters (DACs) placed at each relevant amplifier. This improves the channel to channel uniformity of the chip.

38. There is a test input to each channel for testing the ASIC chip without need to connect the inputs to a detector or signal generator individually. Extra test channels placed one at the top and one at the bottom of the column of channels. The test channel allows the testing and calibration of a chip without connecting signals to all the inputs. The extra channels one on each side of the column of channels helps in testing the chip as strategically located test pads are placed in these channels. Also the channels on the sides of an ASIC chip are more prone to have problems. Therefore having a test or dummy channel on the two opposite sides of the column of detectors is important to achieve good yield.

39. The ASIC chip is made daisy chainable such that several chip outputs can be connected to one bus and read out serially. This reduces external electronics needed to readout a chip.

40. The detectors and ASIC chips are mounted onto ceramic carriers or printed circuit boards. Which are in turn are also mounted on mother boards to form the detector arms. This done to produce a modular system, where repairs can be done by replacing mother boards and mother boards can be repaired by changing the failed detector or the ASIC chip mounted on a ceramic carrier or PC board.

41. The long linear detector arms (straight or curved into an arc) are placed surrounding the conveyer belt or object completely. Each arm can cover an angle of 30°, 60°, 90°, 120°, 150°, 180°, 210°, 240° or 270°. This is again a modular system with a cost effective arm length as short as possible. The arms are placed at separate planes rotated by about the arc length of each arm to cover up to 360 degrees around the conveyer belt or the object.

42. Point x-ray sources separated at regular distance from each other placed opposite to the x-ray detector arms to produce complete coverage of the object and to generate a tomographic image. The x-ray sources can be placed on an arc. Several x-ray sources allows a tomographic image to be produced instead of a two dimensional one. The larger the number of the x-ray sources the higher the quality of the tomographic reconstruction.

43. Single x-ray source facing a detector array arm that moves up and down or side to side on during a scan to produce complete coverage of the object and to generate a tomographic image. The single x-ray source can be moved up and down or side to side on an arc with radius about equal to the distance of the x-ray source focal spot to the detector surface. Two x-ray sources displaced from each other that move up and down or side to side traveling opposite in direction to each other to increase scan rate. This is a cost effective solution to reduce number of x-ray sources to one or two for each detector arm. The x-ray source on an arc can be important for more accurate detector response.

CONCEPT

1. An energy resolved, "true color", or multi spectral detector for baggage scanning (or other type of scanners) that surrounds the conveyer belt completely.

2. Multiple x-ray sources or one or two oscillating x-ray sources that illuminate the detector arms to image objects traveling on a conveyer belt type of system.

3. Linear pad or pixel detector arrays that can produce the energy resolved or multi spectral images.

4. Custom mixed signal multichannel ASIC chips to read out the detectors.

5. Interface electronics between the ASIC chip and the host data acquisition computer.

BRIEF DESCRIPTION OF THE DRAWINGS

FIG. 6a Is a drawing of curved ENDON detectors.

FIG. 6b Shows straight ENDON detectors.

FIG. 6c Shows the depth effect for an x-ray photon and also an x-ray photon that does not have depth effect.

FIG. 12 Shows the Circuit Schematic diagram of the new FESA II chip's analog circuit.

DETAILED DESCRIPTION OF THE INVENTION

Figure 1:
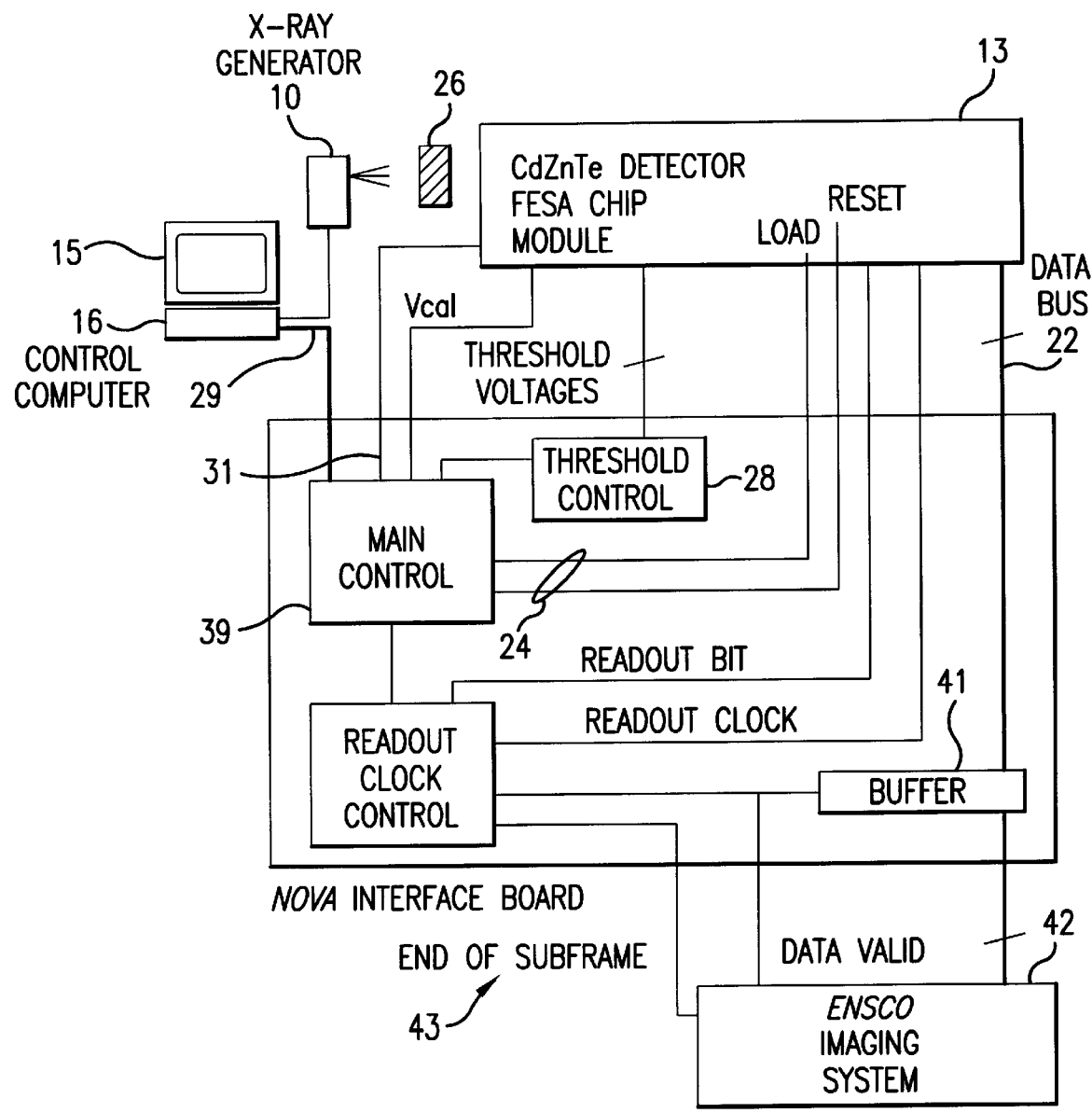
FIG. 1 Shows block diagram of the ABIS control system, indicating the detector/FESA interface to the ENSCO image analysis system.
Figure 2A:
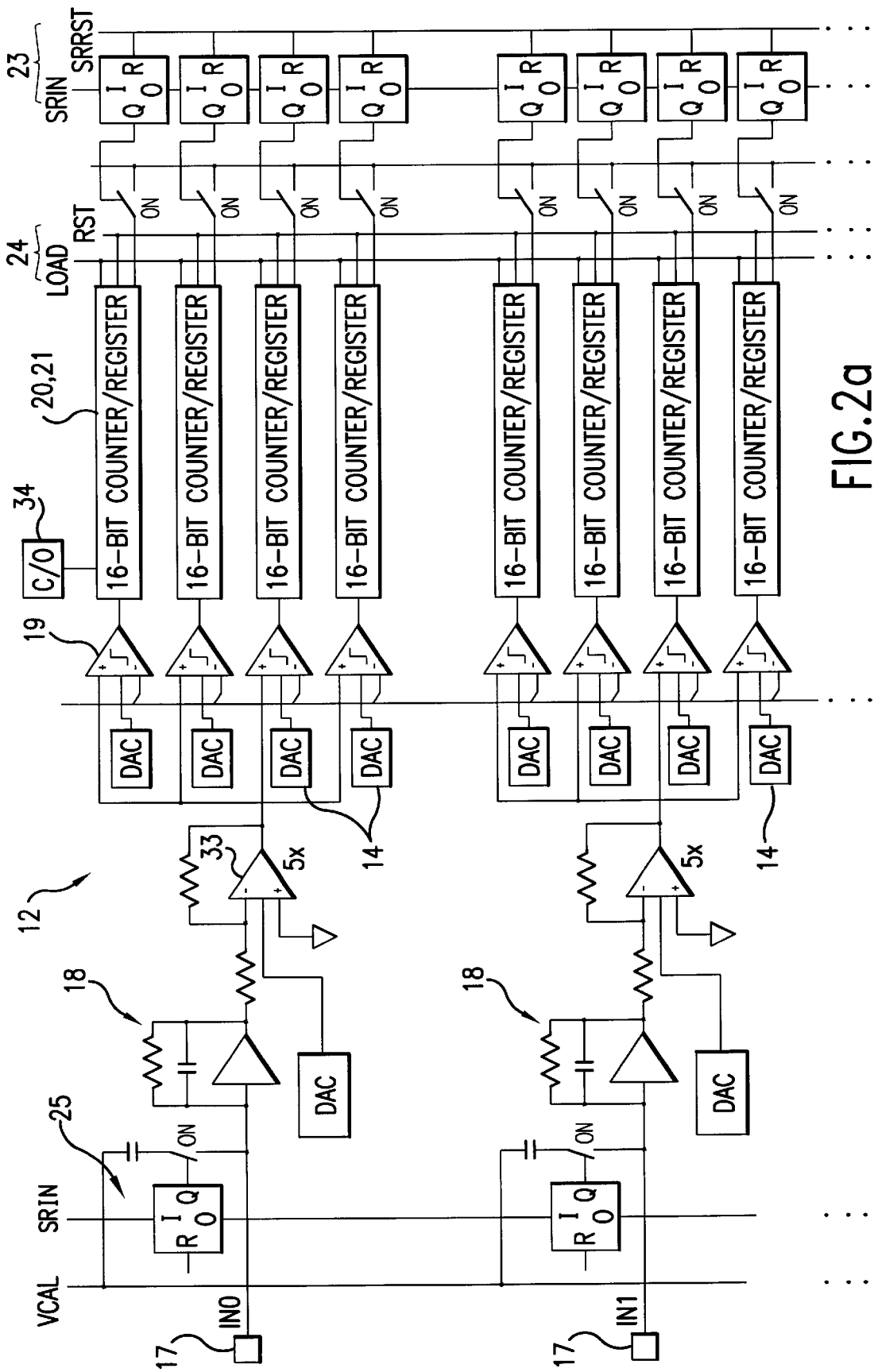
FIG. 2 Shows the Circuit Schematic diagram of the FESA chip's analog and digital functions.

FIG. 1 shows an overall view of an embodiment of this invention used as a radiation detector and non-destructive inspection apparatus may also be used for an automatic baggage inspection system. In this embodiment, a source of x-rays 10 from a point source is used to irradiate an object to be detected 26. The object to be detected is on a conveyer belt or other movable device which provides movement between the source and the object to be inspected, thereby resulting in a scan of the object. Scans made with a movable object or detector can be used to create two-dimensional and/or tomographic images. A CdZnTe detector and Application Specific Integrated Circuit (ASIC) readout electronics called (FESA) chip module 13, hereinafter described in greater detail in FIG. 2, contains a plurality of detector pads or pixels. If the detector elements are small, they are referred to as pixels. The detector chip module is controlled by a main control 39 and a control computer 16. Within the detector module are a plurality of threshold detectors which may require the adjustment of threshold voltages in accordance with the main control 39. This is provided by threshold control 28. Still further, if a particular channel or detector is providing a noisy or undesirable output, it can be turned off by the main control through a separate function provided on connection 31.

Next, as shown in FIG. 1, there is a display 15 which, after computer processing, displays an image of the object to be detected in accordance with colors or gray levels representative of the energy levels of x-rays passing through the object and entering into the detector module 13.

Figure 2B:
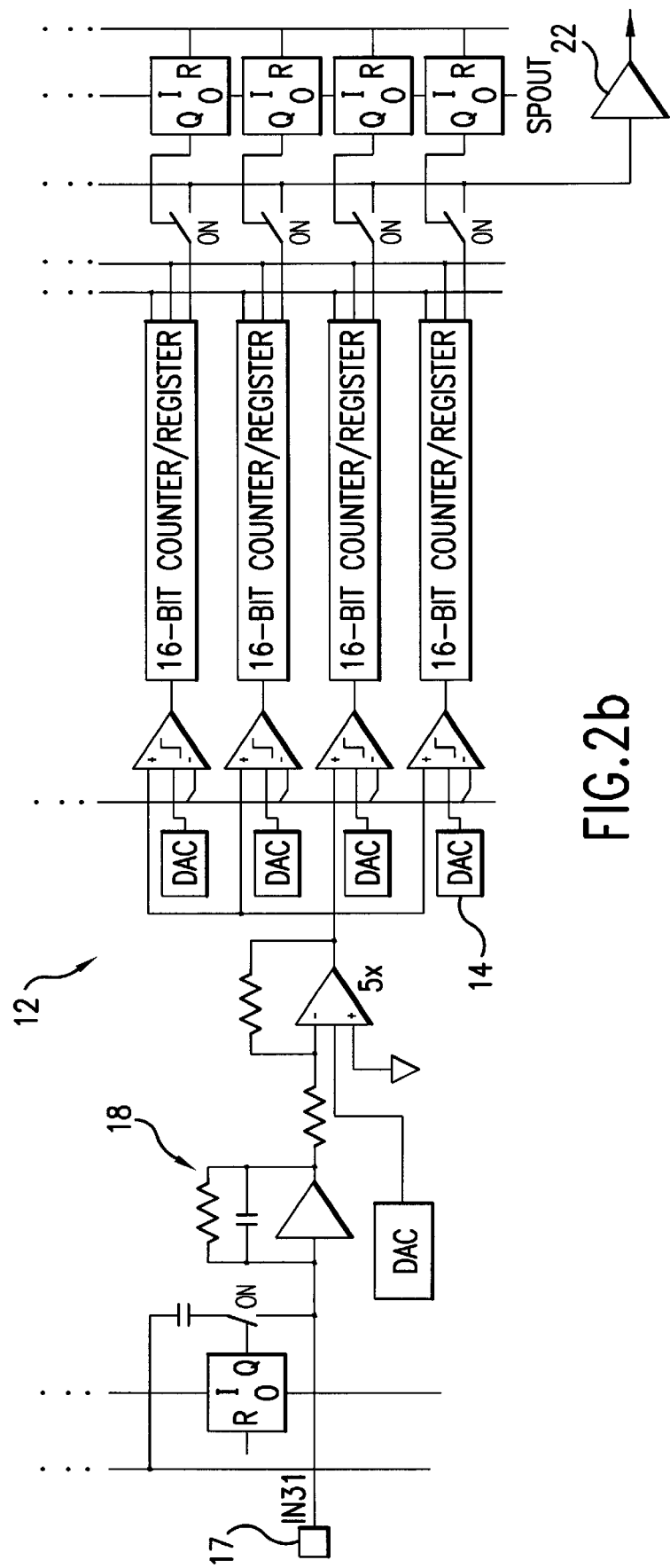

In FIG. 2, there is shown a circuit diagram of the detector and the ASIC chip module 13. Detector and ASIC FESA chip 12 comprises all of the circuitry in this figure. Each detector element includes a detector pad or pixel 17 (if the size is less than 1×1 millimeter, it is referred to as a pixel), which is connected to a charge sensitive preamplifier pulse shaping means 18 which is a high-speed integrator with a self resetting circuit for shaping the pulse. An amplifier 33 amplifies the pulse received from the preamplifier for analysis by a plurality of comparator discriminators 19. More amplifiers may be used. In this example, there are five comparator discriminators 19 for each detector pad or pixel 17. Each amplifier 33 also has associated with it a digital-to-analog converter (DAC) 32 for controlling the gain of the amplifier. This gain is in turn controlled by the main control 39 and the computer 16. If other amplifiers used they may also have gain adjustment circuits.

Each amplifier's offset voltage may also be adjusted using one or more DACs or other adjustment circuitry separate than the DACs used for the gain adjustment. Also the channel-to-channel threshold variations of each comparator may also be adjusted by a DAC 14 or by another adjustment circuitry.

In each channel, the five level comparators produce outputs when their input voltages are exceeded. For instance, in the top channel, a voltage of 100 millivolts or higher may produce an output at the first comparator and a voltage of greater than 200 millivolts may produce an output at both comparators one and two. Similarly, voltages larger or equal to 300, 400 and 500 millivolts produce outputs at the less sensitive comparators. As x-rays pass through the object to be detected 26 from source 10, the more powerful x-rays produce higher voltages and hence, registration in the counter of the least sensitivity, i.e., the counter which is sensitive to voltages greater than 500 millivolts. If the counts obtained from different comparators in each channel are subtracted the counts for that energy band bordered by the two comparator levels can be obtained.

Image analysis can then be performed by assigning colors or gray levels arbitrarily to the different voltage levels or more appropriately to the counts observed from each comparator in the corresponding counter. The colors can be a function of the number of counts accumulated in counters 20. At periodic intervals, information may be transferred from counters 20 to registers 21 or readout directly from counters without using registers. After transfer from counter 20 to register 21, a new count can begin at counter 20, while data is being read out from registers 21 onto a data output bus 22. The readout of the data onto data output bus 22 is under control of shift registers 23 shown on the right-hand side of FIG. 2. If counters are readout without using registers than the counting can not begin until the counter or all the counters are readout and reset or preset.

The counters 20 may also include counter overflow detectors 34 for stopping the count or raising a flag bit when a counter overflows.

The radiation source 10 may also be turned on and off as each image of object 26 is detected. In order to provide color display indicative of the energy level of received photons, there should be at least two comparators (threshold detectors) per channel (pixel or pad). As many comparators (threshold detectors) may be used as are necessary to provide the sufficient number of energy bands for information display. The main control also provides the load and reset functions on lines 24 as shown in FIGS. 2 and 1.

Figure 3:
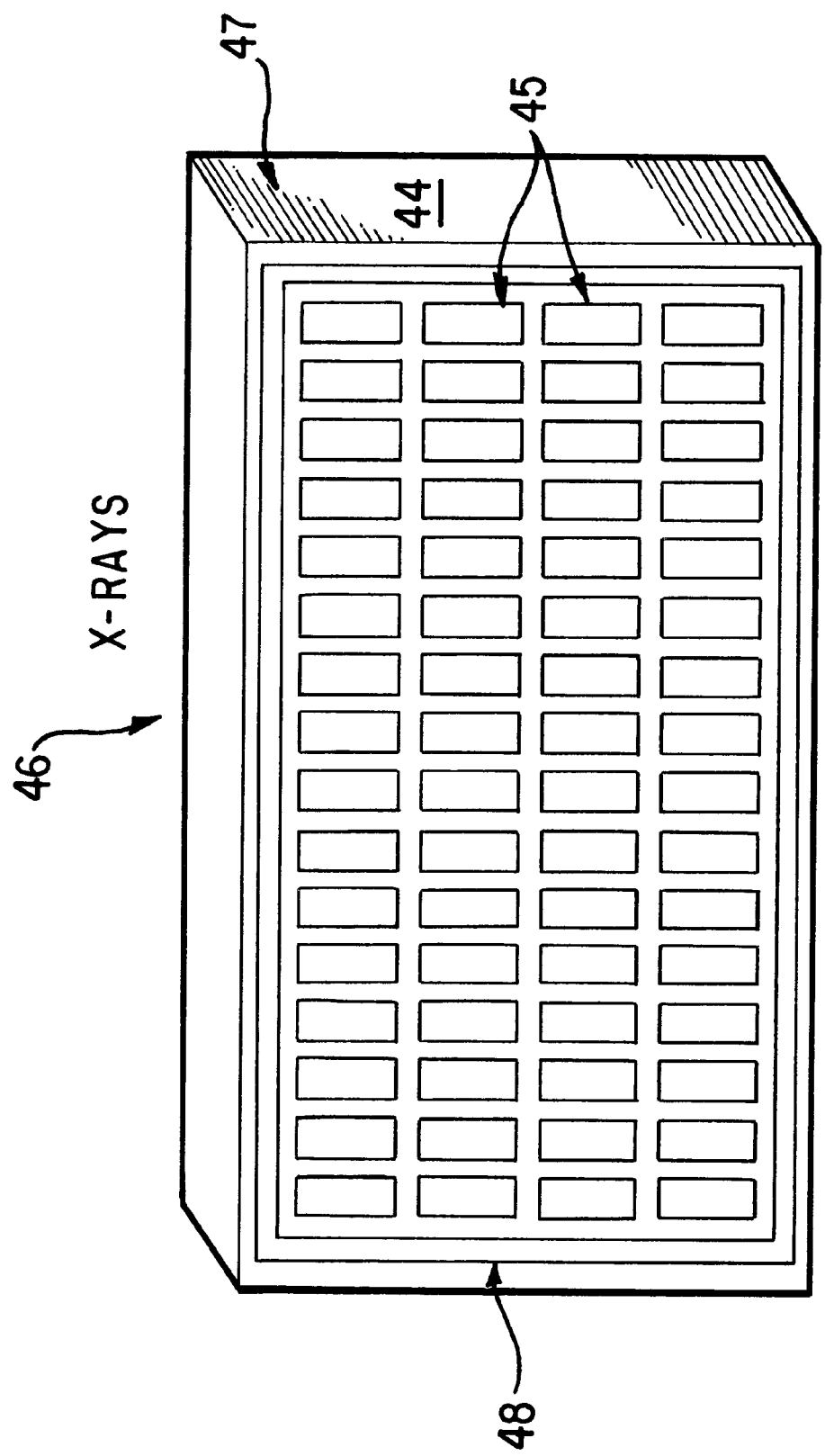
FIG. 3 shows a position sensitive energy resolving multi-spectral "ENDON" detector array.

In FIG. 3, there is shown a position sensitive energy resolving spectroscopic ENDON detector array. In this embodiment, the depth of penetration of the incident x-rays is a function of the incident energy. The deeper the x-ray penetration, the greater its energy. In this way, the different energy bands can be detected as a function of the count of each pixel or pad, instead of by means of a comparator or discriminator circuits such as comparator 19 shown in FIG. 2. This is an alternative method of determining energy bands.

Figure 4:
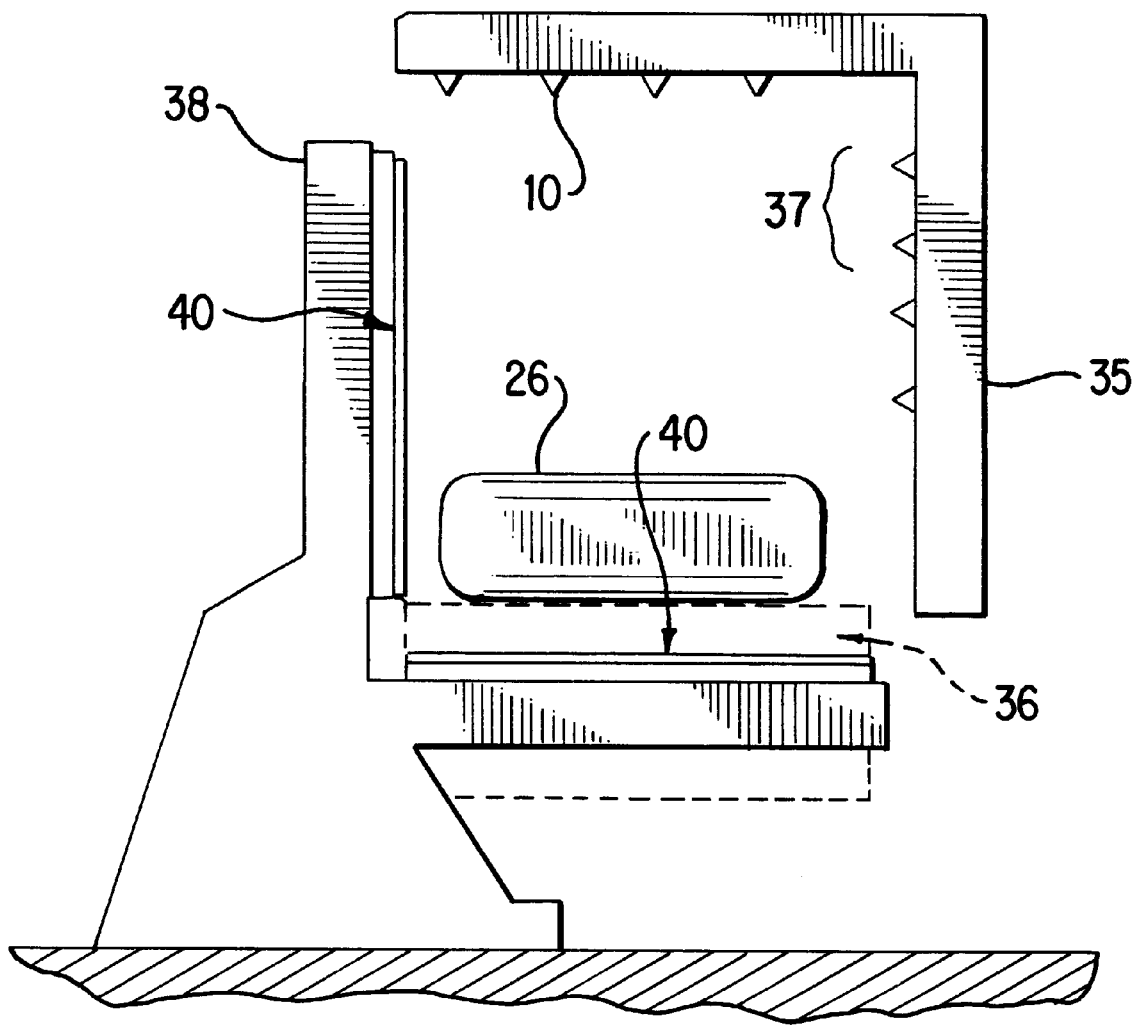
FIG. 4 Shows an ABIS system with the CdZnTe linear array detector assembly.

In FIG. 4, there is shown an automatic baggage inspection system in accordance with this invention, where a conveyer belt 36 carries an object to be detected 26. In this embodiment, there are a pair of long arms which are used to hold a plurality of point x-ray or gamma-ray sources 10. Opposite the long arms 35 are a corresponding pair of long arms 38 which carry detector arrays. The different x-ray sources 10 can be turned on at different times in order to provide different views of the object to be detected as seen by the detector arrays 40. In this way a two-dimensional and/or a tomographic image may be produced for each energy band.

PAD OR PIXEL DETECTOR

CdZnTe pad detectors with a novel geometry and approximately 1 mm are have been developed. These detectors have been specially designed for high energy resolution up to 300 keV energies. The contacts are produced through a unique technique developed by eV Products, address: 375 Saxonburg Boulevard, Saxonburg, Pa. 16056, to achieve high reliability low resistance coupling to the substrate. A ceramic carrier is designed (FIG. 8) for low capacitance coupling of the detectors to the FESA chip. The detectors have been tested using ultra low noise single and 3-channel amplifiers developed by eV Products. CdZnTe detectors have also been tested for dark current. (Charge energy resolutions and collection times have also been measured using natural radiation sources.) The measured detector parameters and the test results show that linear pad arrays have good uniformity and excellent application potential for imaging x-rays and gamma-rays. The results obtained for the energy resolution are excellent for spectroscopy applications in nuclear physics, and the short charge collection time can be used for fast imaging.

CdZnTe pad detector geometry (FIGS. 7a and 7b) having a 1 mM$^2$ pad area are disclosed. These pad type linear arrays are important for many scanning type applications using a wide energy range (from about 10 to 300 keV). The mounting of these detectors on ceramic carriers to achieve low capacitance and low noise is important for application of these detectors to industrial and medical imaging.

The special contacts achieve high reliability low resistance coupling to gold pads on a ceramic carrier specially designed for wire bonding to the multichannel charge sensitive front end readout chip.

EXAMPLE

Figure 7A:
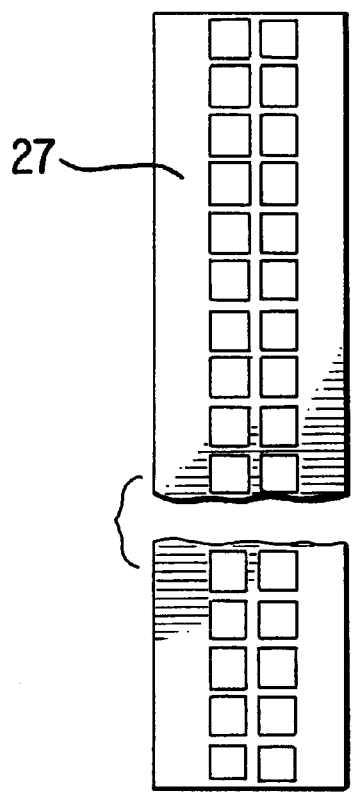
FIG. 7a Shows the linear CdZnTe pad array (bottom view).
Figure 7B:
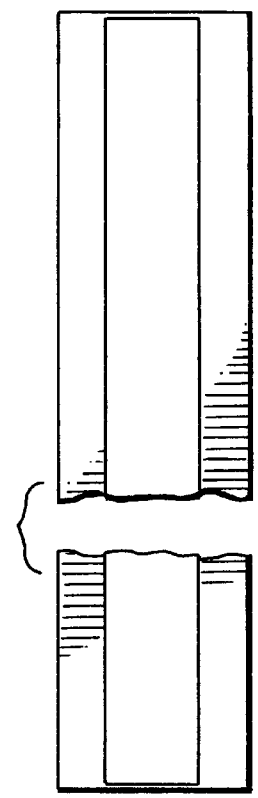
FIG. 7b Shows the linear CdZnTe pad array (top view).
Figure 8:
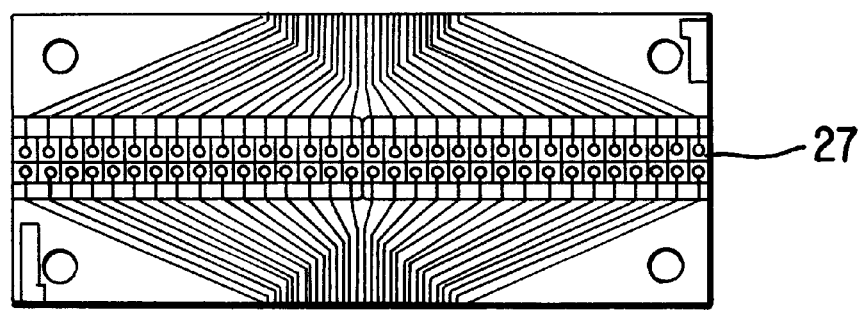
FIG. 8 Shows the ceramic carrier for the CdZnTe detector array.

A CdZnTe detector array with two columns of 32 pads with two 1 mm wide substrate columns on each side as a guard structure (FIGS. 7a and 7b) has been designed. The thickness of the detector is 1.75 mm. The pad size is 0.95 mm with 100 $\mu$m spacing in between. The two-dimensional array of paths 27 is shown in FIGS. 7a and 7b. The ceramic carrier for the CdZnTe detector array was designed to be 32 mm long, 14 mm wide and 0.020 inches thick (FIG. 8). Short low capacitance and resistance traces were used. The carrier contacts were designed on the edge for each side to be compatible with a high quality ultrasonic wire bonding technique. The contact pitch was 300 $\mu$m. Two High Voltage (HV) bias contacts are placed on opposite corners of the carrier on each side of the major axis.

Figure 9:
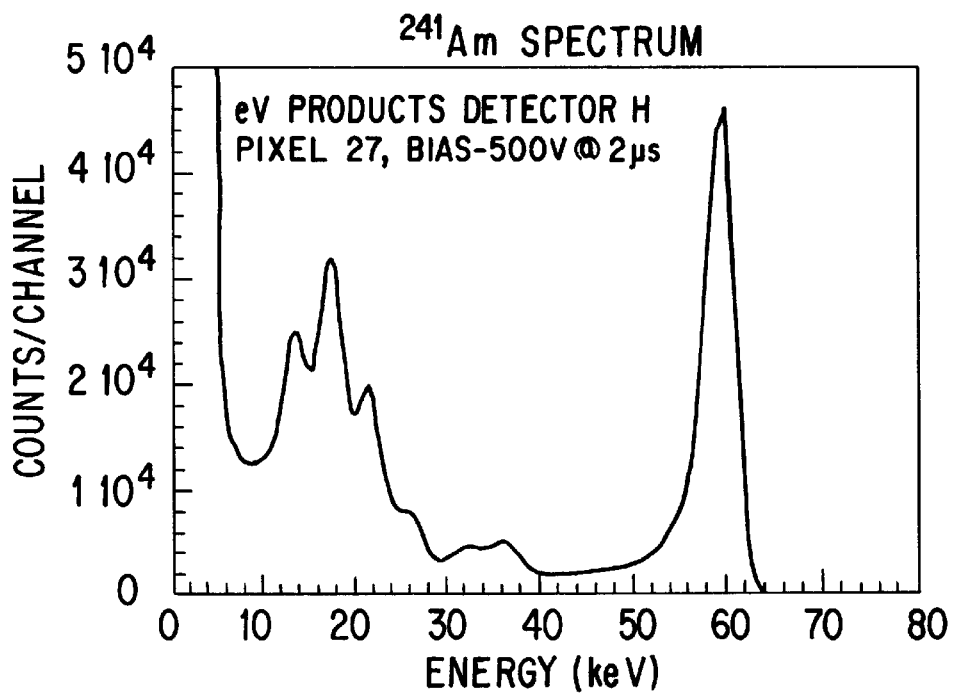
FIG. 9 Shows an energy spectrum of a typical pad on a CdZnTe linear pad array detector irradiated by 241 Am source. The bias applied is −500 V.

The results of the energy resolution measurements show that pad detectors with about 1 mm pitch produce slightly better results compared to single element larger area detectors. FIG. 9 shows the energy resolution obtained for a typical pad with 2 $\mu$s shaping time at −500 V bias and irradiated by $^{241}$Am. The energy resolution is also obtained for the same pad and irradiated by $^{57}$Co source under same conditions. The energy resolutions obtained are about 6% @ 60 keV ($^{241}$Am) and 8% @ 120 keV ($^{57}$Co), respectively.

Figure 10:
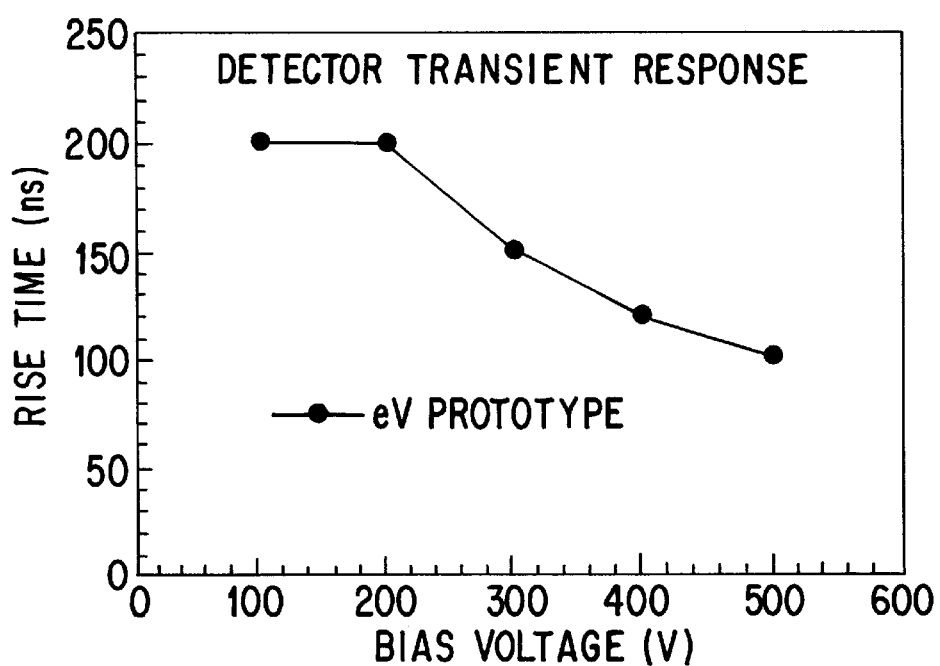
FIG. 10 Shows the rise time versus bias voltage for a typical CdZnTe detector element.

The variation of charge-collection time as a function of the bias voltage applied is shown in FIG. 10. It shows that the charge collection time decreases with increase in the bias voltage reaching about 100 ns at about 500 V. The collection time measured here is for electrons only. The results show that CdZnTe pad detectors can be used for fast imaging applications. This measurement is made with a high input impedance digital oscilloscope looking at the output of an eV-5093 preamplifier. A discussion of the timing properties of CdZnTe is also given in Parnham et al. A study of The Timing Properties of $Cd_{0.9}Zn_{0.1}Te$ submitted to IEEE Trans. Nucl. Sci. October 1995, which is incorporated herein by reference.

The CdZnTe detector arrays were measured for dark current. All the pads on these detectors were tested for dark current as a function of bias voltage up to 550 volts. Energy resolution of all the pads on each detector were also examined by a multichannel analyzer while exposing the detectors to $^{241}$Am. The results are summarized in Table I below.

TABLE I

The results of tests carried out on two prototype detectors C & D at −500 V bias.

| Detector | <Idark> | % ≦1 nA | Energy Resolution <∂E/E> % |
| --- | --- | --- | --- |
| C | 0.82 ± 0.07 nA | 74% | 6.98 ± 0.18 % @ 60 keV |
| D | 0.41 ± 0.03 nA | 97% | 7.37 ± 0.08 % @ 60 keV |

The measured detector parameters and the test results show that linear pad arrays can have good uniformity and excellent application potential for imaging x-rays and gamma-rays. The results obtained for the energy resolution are excellent for spectroscopy applications in x-ray imaging and also in nuclear medicine or physics. The improved energy resolution of a linear CdZnTe pad detector array may be due to the small area of the pad. The technique developed by P. N. Luke, "Unipolar Charge Sensing with Coplanar Electrodes—Application to Semiconductor Detectors", IEEE Trans. Nucl. Sci., Vol. 42, no. 4, pp. 207–213, August 1995 may be applied to the pads on this detector to improve energy resolution by reducing the low energy tail due to trapping.

THE POSITION SENSITIVE SOLID STATE PAD OR PIXEL DETECTORS

In x-ray or gamma-ray radiation measurements, three major type of processes are of interest: photoelectric absorption, Compton scattering, and pair production. All these processes lead to the partial or complete transfer of the gamma ray photon energy to electron energy. The only process important for the proposed technique is the photoelectric absorption. The photoelectric absorption process dominates below about 250 keV for CdZnTe detectors well within the range required for the proposed technique. A 2 to 4 mm thick CdZnTe linear pad detector array can absorb about 90% to 99% of the incident 100 keV x-ray photons, respectively. Therefore, a detector with thickness 2 to 4 mm is preferred.

The position sensitive solid state such as $Cd_{1-x}Zn_xTe$ pad or pixel detectors may be designed with pad pitch of 1 mm. The 32 pads can be constructed on each side of a 2 mm×32 mm active area (FIGS. 7a and 7b). The thickness of the CdZnTe pad detectors can be made from 2 to 4 mm. The energy resolution has been measured to be ≈4 keV @ 60 keV using laboratory NIM electronics modules for spectroscopy. The leakage current is less than 1 nA per pad. The production of such a prototype detector shows that a custom optimized CdZnTe pad detector can be constructed. Therefore, they can be used for spectroscopic tomography. Table II summarizes some of the basic specifications of the CdZnTe detectors.

TABLE II

Specifications $Cd_{0.9}Zn_{0.1}Te$ Pad Detectors

| | |
| --- | --- |
| Energy Resolution: | ≈4 keV FWHM @ 60 keV |
| Energy @ Compton = Photoelectric Effect: | ≈250 keV |
| Linear Atten. Coefficient @ 31 keV: | 100 cm$^{-1}$ |
| Linear Atten. Coefficient @ 53 keV: | 60 cm$^{-1}$ |
| Photon Absorption Efficiency: | >99% @ 30 keV for 2 mm thick CdZnTe |
| Spatial Resolution Range: | ≧50 μm |

A design of a double column CdZnTe pad detector array is shown in FIGS. 7a, 7b, and 8 and FIG. 2(a). A single column or any multiples or columns or a two-dimensional array may also be used in this project. The bottom, pixelated, side is bonded on to a ceramic carrier (FIG. 8) for reading out with an optimized FESA chip. If multiples of columns or a two-dimensional array is used then the pads or pixels can be routed out to the sides of the ceramic carrier for connection to the ASIC chip inputs as shown for a two column pad array in FIG. 8. (The x-ray beam is incident from the top side.)

The energy resolution for CdZnTe pad detectors is excellent because of the large number of electron-hole (e-h) pairs created. Approximately one e-h pair is produced per 4.4 eV energy deposited. For x-rays with energy of $E_o$=100 keV completely stopped in CdZnTe, about 22,700 e-h pairs are produced. Assuming a Poissonian process, the limiting (theoretical) resolution due only to statistical fluctuations in the number of charge carriers, $R_I$ can be calculated to be 1.5% if the recoil electron completely stops in the CdznTe active volume. $R_I$ is calculated by:

$$R_I = FWHM/E_0 = 2.35/\sqrt{N}$$

where N is the number of e-h pairs created.

The limiting energy resolution for ≈60 keV x rays can be calculated similarly to be ≈2%. An x-ray spectrum was measured for a CdZnTe pad detector array manufactured by eV Products with 1 mm$^2$ pad size. The energy resolution is ≈4 keV for 60 keV x rays (FIG. 3) and may be improved significantly by reducing the low energy tail due to charge trapping. The energy resolution at higher energies, is also good.

The measured energy resolutions as given in Tables I and II are dramatic improvements over scintillators, e.g. NaI(Tl), 30% at 60 keV. CdZnTe pad detectors also have small capacitance, ≦1 pF per pad, which leads to low noise charge amplification to preserve the excellent energy resolution. The good energy resolution is important for spectroscopic imaging. The energy of the detected photon can be binned into 5 or more channels and a tomographic image can be produced for each energy channel for possible identification of imaged material and also may be used to identify the contents of a baggage.

Figure 11:
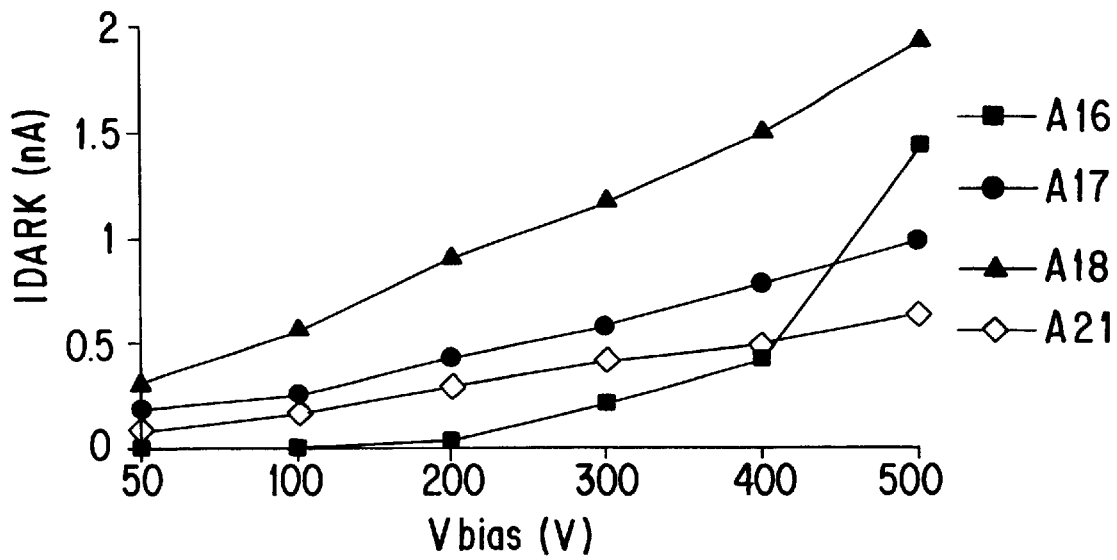
FIG. 11 Shows dark current for four typical pads measured from a prototype detector array as a function of the bias voltage.

FIG. 11 shows a sample of dark current measurements for 4 pads including two pads at the two ends of the detector array. Large bias voltages reaching 500 V does not increase dark current significantly.

Specifications for the CdZnTe Pad Detector

The specifications of a CdZnTe pad or pixel detector are given below:

| | |
|---|---|
| Thickness: | 2 to 4 mm. ($\leq \pm 0.05$ mm). |
| Overall dimensions: | 4 mm × 32 mm per detector module (the extra area may serve as a "guard ring"). |
| Pad pitch: | 1 mm (both directions). |
| Pad size: | 0.95 mm × 0.95 mm (50 $\mu$m or greater inter-pad spacing between pads) |
| Number of pixels: | Two columns of 32 pixels each per detector |
| Energy resolution: | ≈3 keV @ 30 keV, ≈4 keV @ 60 keV |
| Pad capacitance: | $\leq 1$ pF. |
| Contacts: | Thin, high reliability and low resistance. |
| Dark current: | I (dark) $\leq 1$ nA/pixel @ 500 V, ($\pm 50\%$) |
| Carrier: | Ceramic, 32 mm ± 0.2 mm long, 18 mm wide and 0.020 inches thick. |
| Carrier contacts: | On edge, compatible for ultrasonic wire bonding |

THE FRONT-END MIXED SIGNAL ASIC READOUT CHIP

The Front-end Electronics for Spectroscopy Application (FESA) chip was developed to read out the position sensitive solid state pad or pixel detectors for radiation detection and non-destructive inspection apparatus. It may also be used for an automatic baggage inspection system.

A Front-end Electronics for Spectroscopy Application (FESA) ASIC ship is shown in FIGS. 2 and 12. FIG. 2 shows the first version and the FIG. 12 shows the second version design. The FESA ship has 32 DC coupled channels plus one or two test channels. Each channel has a preamplifier 33, a shaper 18, and five independent comparator-counter-register chains (FIG. 2). The preamplifier will reset itself automatically, to allow for high pulse rates. The analog and digital sections can be built on separate chips to reduce cross talk from the digital circuitry into the sensitive analog front end. The digital section starts with the five comparators and includes all the digital electronics including the counters, registers and readout electronics. Each of the five comparators has a separate threshold control, and so when a channel is hit, any comparator whose threshold is exceeded will have its associated 16-bit counter 20 incremented. Upon receipt of a load signal, the counter contents may be loaded into their corresponding registers 21. The counters may also be directly readout as in second version of the FESA chip. The data in the registers will be read out by indexing the readout shift register while simultaneously acquiring new data from the front end.

New FESA II Chip

One channel of the analog section of the new FESA II chip is shown in FIG. 12. It has 32 channels plus two test channels. A calibration input VCAL 54 is provided through a capacitor CCAL 55 which is enabled by ECAL 56. Individual channels can be turned on and off by a control bit in ECAL associated with each channel. The charge pulse entering the input DET 57 turned into a voltage signal by an amplifier 58 which is restored by a slower amplifier 59. TSEL 60 controls the time constant of the charge integration and ITAU 61 controls the time constant of the restoration. The amplifiers A2 62 and A3 63 amplify the signal. The amplifier gains and offsets are programmable using DACs to compensate for gain and offset variations due to recovery time changes and components mismatches. The analog output of any channel may be directed to an output buffer 64 by enabling a bit in the channel control register. The polarity of the signal charge selected by the POL input 65. Various internal bias voltages and currents are generated by the BIAS circuit 66.

The digital section of the circuit is similar to the original FESA chip. The analog output of each channel go into five comparators. The threshold variation of each comparator is adjustable using a DAC at each comparator. The output of each comparator goes into a counter. The counter is externally controlled for starting, stopping and resetting. The output of the counters are multiplexed and read out. A delay is produced to allow the ripple counters to complete counting before readout starts.

FESA Chip Test Results

Figure 13:
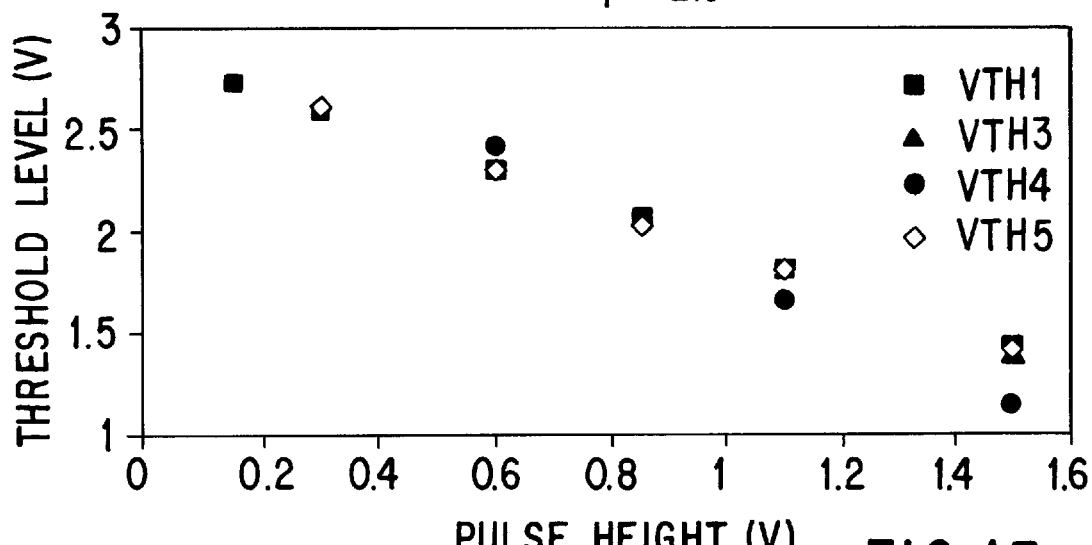
FIG. 13 Shows a plot of pulse height versus threshold level for a typical channel of a prototype FESA chip.

The FESA chip was tested for the voltage threshold accuracy. The relationship between voltage threshold and pulse height is given approximately by $V(th) \approx -V(ph)+2.9$. A plot of the voltage threshold for one typical channel is shown in FIG. 13. For this test, pulse heights of 0.15, 0.30, 0.60, 0.85, 1.10 and 1.5 V were used, and some of the data points for VTH1, VTH3, VTH4 and VTH5 overlap. The threshold level is a voltage applied to the comparator circuitry.

Figure 14:
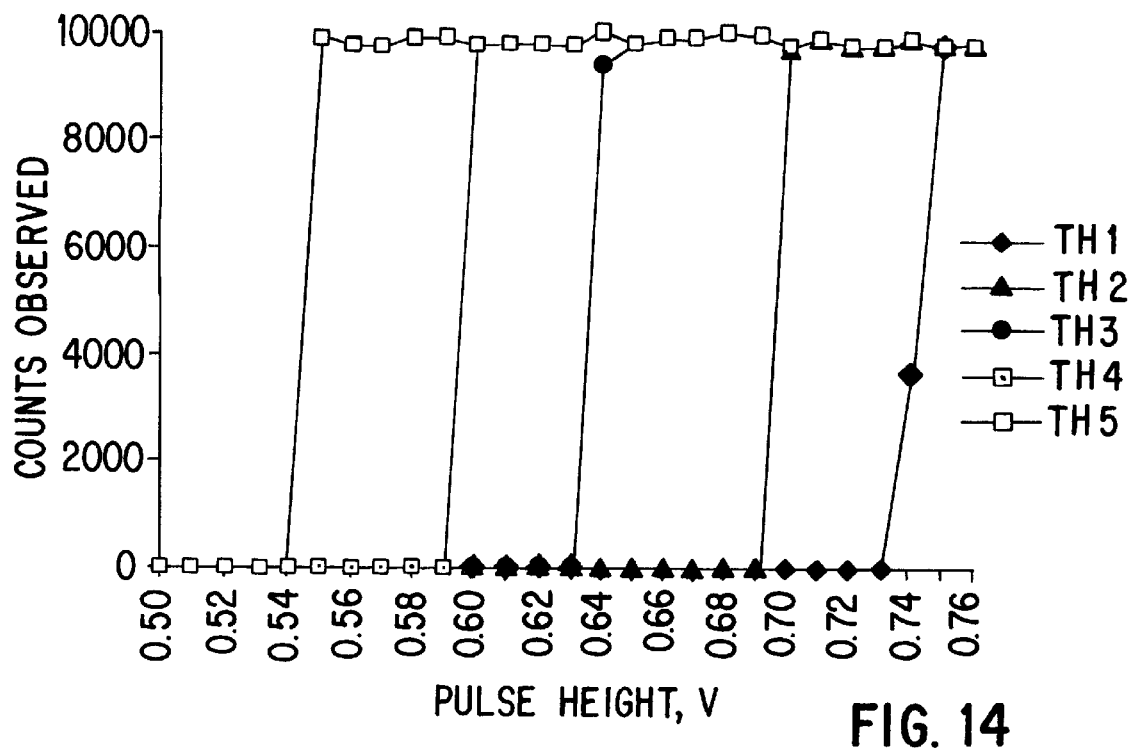
FIG. 14 Shows pulse height versus counts observed for all 5 comparator outputs for one channel.
Figure 15:
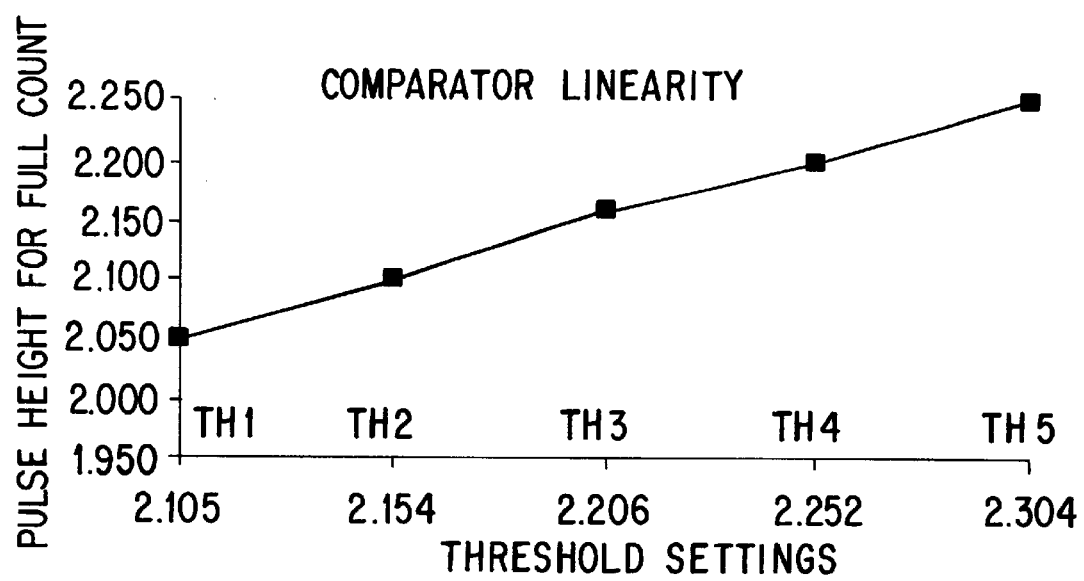
FIG. 15 Shows the comparator linearity as the threshold setting vs. pulse height for full counts observed.

FIG. 14 shows the accuracy of the comparator threshold level. The five thresholds were set ≈50 mV apart. The fast response of the comparator to the input signal pulse height as soon as it crosses the threshold is shown. The actual value of the thresholds were 2.105, 2.154, 2.206, 2.252, and 2.304, for thresholds 1 through 5 respectively (FIG. 15). The results show that the comparators were working as designed.

It is expected that if the thresholds are ≈50 mV apart, then the transition to full count should occur at intervals of ≈50 mV as well, i.e. it is a linear relationship. FIG. 15 shows a comparison between these voltages, and the FESA chip linearity is excellent within the precision of this test.

Figure 18:
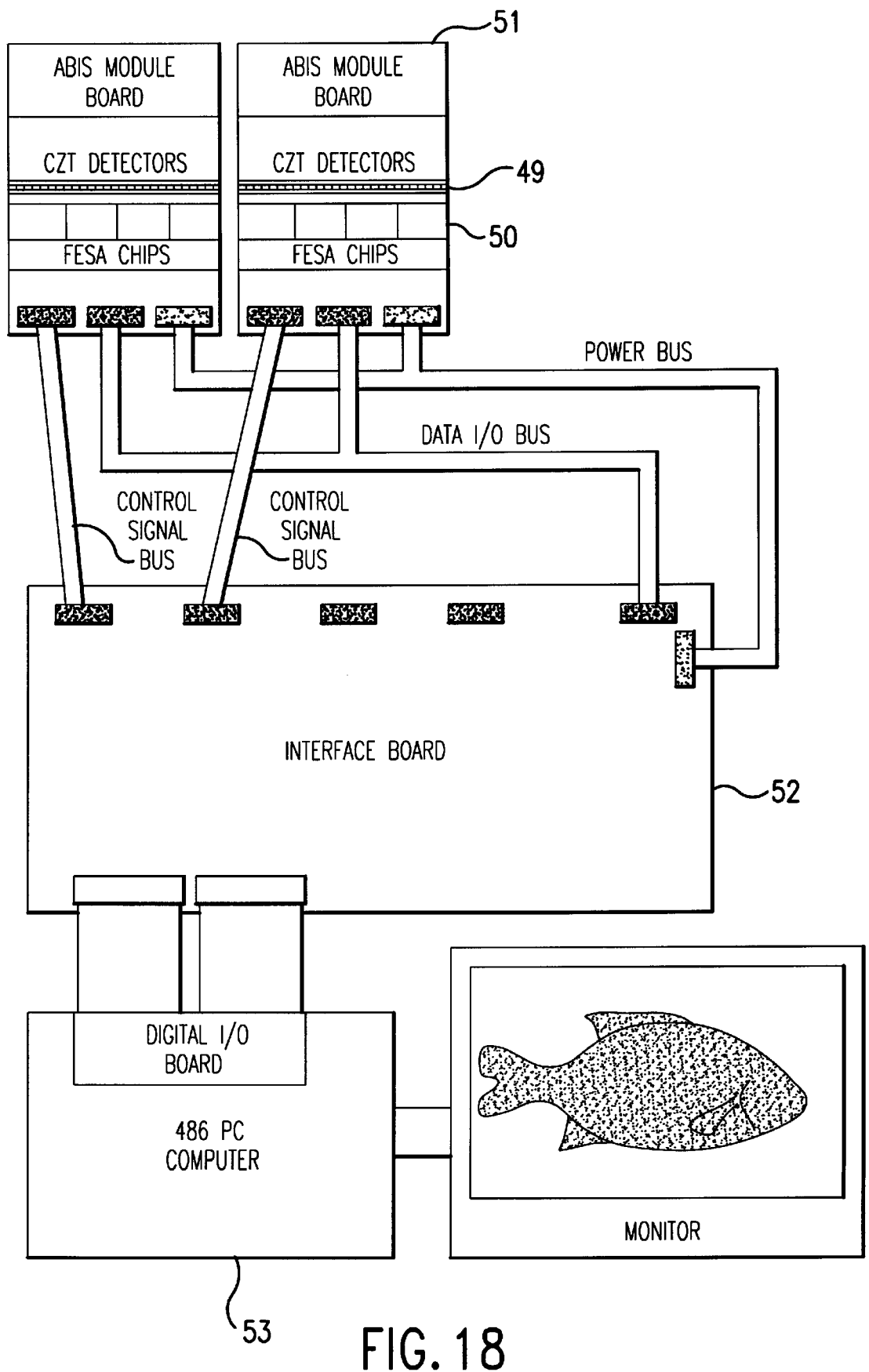
FIG. 18 Shows the setup for the ABIS detector demonstration system.

The detectors 49 and FESA chips 50 are mounted on ABIS module boards 51. The module boards were connected to an interface board 52 which is used for the interface between the ABIS module boards and control and data acquisition computer 53. A schematic of the setup is shown in FIG. 18.

To acquire images, the object must be translated over the line of detectors. To accomplish this a luggage scanner equipped with a 90 kV x-ray generator and a fixed speed conveyor belt was used. A 160 kV generator may also be used.

The box cover was made of lead that had a long slit in it so that x-rays could illuminate the detectors through the material scanned. A thin aluminum foil covered the slit to prevent stray visible light and low energy x-rays from entering the box. This detector box was then placed under the conveyor belt.

FESA Chin Specifications (All Versions)

Process: 0.5 to 2 $\mu$m CMOS process
Number of channels: 32 or 128
Chip size: 5 mm×5 mm to 10 mm×10 mm
Bonding pad pitch: Input pads 100 to 200 $\mu$m, control pads 200 to 300 $\mu$m
Integration time: Adjustable integration time (peaking time), approximately 50 to 2,000 ns
Noise: Designed between 200 to 1,000 e⁻ RMS for few pF input capacitance.

Analog stability: Input preamplifier bandwidth is enlarged as much as possible for stability.

Pulse shaping: Shaping may be achieved by pulling to ground the integrated signal as soon as the comparator(s) fire. A self resetting type charge sensitive preamplifier may also be used. Self resetting type amplifier is preferred. However, an automatic sample-and-hold circuitry may also be used. Other techniques such as flat top shaping or peak hold circuitry with automatic reset may also be used. An external sample-and-hold signal may be required during testing and evaluation.

Amplifier gain: Adjust the amplifier gain through computer control by using a digital-to-analog converter (DAC) circuit or any other circuit that can do the same function to adjust the output offset of each amplifier(s) at each channel separately to make analog output variations from channel-to-channel as small as possible.

Amplifier offset: Adjust amplifier offset through computer control by using a digital-to-analog converter (DAC) circuit or any other circuit that can do the same function to adjust the output offset of each amplifier(s) at each channel separately.

Spectral analysis: Output of each channel goes through five comparators and logic gates to divide the input pulse height into five separate consecutive energy bands. Each channel must independently increment five 16 to 24 bit binary counters through the five comparators and corresponding logic circuits. It is also possible to use a minimum of one counter corresponding to one energy band to any number of counters for that many energy bands.

Spectral band size: The lowest and the highest energy of each spectral band is externally adjustable. An on or off chip digital-to-analog converter (DAC) may be used or any other circuit for adjusting the comparator threshold levels can be employed. The range of adjustment for all comparators is from noise level to the maximum energy level determined by the dynamic range of the FESA chip.

Comparator threshold: Minimize channel-to-channel variations for the comparators using DAC circuits or any other circuit that can do the same function to adjust individually the comparator thresholds at each comparator for every channel separately to compensate the comparator response to threshold voltage variations due to manufacturing differences.

Comparator type: Linear or logarithmic comparators or discriminator circuits with or without hysteresis.

Comparator output: Comparator output may be made of a differential type circuit with low voltage swing instead of a voltage output. This eliminates large voltage swings that can feed back into the sensitive front end preamplifiers.

Comparator level drift: Comparator levels should be stable to about 1%.

Comparator input level: The output of the last amplifier can be a pulse, ground level or the power level. The pulse output and ground level when there are no signals coming through are expected legitimate responses. If the output of the amplifier saturates at power level it is same for the comparator as the ground level and the counting stops. It is not possible to know whether there are no signals coming or the signal has hit the maximum level and saturated the amplifiers. (The ground and power levels can be reversed depending on the pulse polarity.) Therefore, it may be useful to implement a circuit to sense if input to the comparators reach the maximum level.

Counter readout: Three counter readout schemes can be used. First is to readout all the counters in sequence. The second is to readout all the first counters at each channel in sequence then the second counters at each channel and so on. Either both or one of these readout sequence schemes can be implemented. Third is to store simultaneously all the counter contents into registers, reset counters and read out the registers.

Counter reset: Three counter reset modes are implemented. The first method requires immediate automatic resetting of each counter as soon as it is readout. The second method requires an external signal to reset the counter. The third method loads all the counters into registers and reset counters simultaneously. Either all three, two or one of these counter reset modes can be implemented. There can also be one master reset signal to reset all counters at once. This is required before the start of each scan. There can also be a master hold signal which stops all the counters from incrementing keeping the counters at its last incremented value.

Analog & digital parts: Design the analog and digital sections such that they can be separated into an analog and a digital ASIC chip to eliminate crosstalk.

Counter increment time: $\geq$10 MHz.

Data readout time: Each counter or register can be readout in 25 to 70 ns

Power: Approximately 3 to 5 mW per channel.

Linear dynamic range: Analog branch: Noise level to 150 keV (or $\leq$350 keV) (noise to $\leq$35,000 e-h pairs)

Input polarity: Both negative or positive. Capability to readout either electrons or holes.

Cross talk: $\leq$1%

Dark current drift: Provision must be built in to eliminate dark current drift which may cause premature channel firing due to increase in noise on any channel. This may be done by sampling noise between events and using the level as an automatic comparator threshold adjustment or by sending a command to turn off the offending pads by computer control.

Tristate readout bus: The internal tristate data readout bus is pulled to ground or power rail for stability.

Test input: Each channel should be connectable to an output one by one and a test charge pulse sent through a test capacitor to test and calibrate that channel.

Input capacitance: Chip input capacitance should be optimized to about 1 to 6 pF to enable improved performance at this or lower pad capacitance.

Multi hit capability: Many events per chip are expected within the resolving time of the chip. Each event must be independently divided into its spectral band and increment the corresponding counter. That is each channel with its five comparators and counters must be able to run independently from other channels.

Control signals: Control signals such as a signal to stop the chip from taking data, shunting all inputs to ground may be employed. Also a master reset which resets all channels may be also be implemented used.

Data acquisition: X-ray events are received by the solid state two-dimensional pad detector array in random. The energy of the x-rays may vary from about 10 to 350 keV. They produce 2,300 to 80,000 e-h pairs in the detector. Either electrons or holes may be received at the input of the FESA chip. The coupling can be DC or AC. The charge must be amplified by charge sensitive preamplifier. A self resetting type charge sensitive preamplifier is preferred. An optional shaping or normal amplifier may follow the charge sensitive preamplifier. The signal after the amplifiers goes to the five comparators for spectral separation into energy (pulse height) bands. Each comparator output goes into a counter which counts the pulses generated by the comparator for each incident x-ray photon at the corresponding detector pad. The counts accumulated at each counter represents an energy (pulse height) band.

Data acquisition modes Two data acquisition modes can be used: The first mode is when the counters can start counting again when the data on them is transferred onto the output registers resulting in ≈100% duty factor and ≈0% dead time (needs registers and takes extra room on the chip), and in the second mode the counters are stopped counting during the data readout time to allow reading them out. (Register space is saved but some dead time is introduced.)

Data readout: The external data acquisition system automatically reads out all the counters in sequence using one of three readout techniques given above. The readout may be synchronized by an external clock. As soon as the counters are loaded onto the registers or a counter is read out those counters are reset either through an internal automatic reset circuit or by the external data acquisition system. Control signals for resetting the chip or counters, loading counter contents onto registers or holding counter contents may also be asserted. The counter contents can be analyzed in real-time by a DSP system and/or stored by the external data acquisition electronics into fast memory.

Counter ripple time: Ripple counters must be given sufficient time for the last count to ripple through before they are readout to avoid mistakes in reading them out. There are three possible techniques that can be considered: The first one is to use synchronous counters instead of ripple counters, the second is to stop the ripple counters, wait sufficient time for the last count to ripple through and then transfer the counter contents out and the third is to stop the input to the counters and delay the readout.

Daisy chained readout: Make FESA chip readout daisy chainable so that several chips can be read out serially.

Counter overflow: It is important to know if counters have overflowed or not as it effects the actual number of x-ray photons received. There are several ways this can be implemented. 1. Stop counting when a counter hits maximum counts, this effects data as the actual number of counts are lost, 2. Keep on counting (counter zeros and starts a new count cycle) but keep a second counter which counts the number of overflows, 3. Increase the number of counter bits so that the counter overflow range is well above normal working range, 4. Increase the counter range by dropping lower level bits so that counter size (number of bits is not changed), this lowers the resolution, 5. Raise a flag when a counter has overflowed, and 6. Carefully study data with nearest neighbors to determine if there was an overflow and add the full counts to the number to correct for the overflow.

Dead time: The chip should not accept a new event until a comparator is triggered. About 10 MHz or higher counter increment rate is preferred per channel of the readout chip.

Pedestal subtraction: If self resetting type charge sensitive amplifier is not used then an automatic pedestal subtraction circuit should be considered.

Automatic Baggage Inspection Control Circuit (FIG. 1)

The control circuit of FIG. 1 synchronizes the x-ray generator 10 and the Data Bus readout 22 from FESA registers 21 (see FIG. 2). The registers are transferred into the ENSCO image analysis system 42, address: 5400 Port Royal Road, Springfield, Va. 22151-2388, through an interface and a buffer 41. A schematic diagram of the system is shown in FIG. 1.

The control computer 16 writes the appropriate values to all the digital-to-analog converters for adjusting the amplifier gains and offsets, and also the comparator thresholds inside the FESA chip, and then resets counter/registers 20, 21 when the system is turned on. It may also go through a self test and calibration using the test input and also the test channels of the FESA chip.

The data acquisition begins with a reset signal applied to the FESA chip to reset the counters 20 and also the readout shift register 23. At this point the x-ray generator 10 is turned on and counts are acquired over the scan time, then the x-ray source may be turned off. The control computer 16 sends a stop signal to the counters 20 or a load signal to the registers 21 so that they copy the current value from their corresponding counters 20. After that, a single read-bit is clocked through the readout shift register 23 and this in turn causes each counter value to appear one at a time on the 16-bit wide readout bus (the width is 18 bit for the second version of the FESA chip). Note that the shift register output from one FESA chip is daisy-chained to the next chip's readout shift register input, so the effective readout system for an assembly of FESA chips is one large shift register.

For testing and calibration purposes, the FESA chip is designed so that any channel can have a test pulse applied to its input by clocking in the appropriate bit pattern into the amplifier input shift register (three control lines for this are not shown) and then applying a test pulse into VCAL input. This will enable frequent application of test and calibration runs in between baggage scans without disrupting the flow.

The data readout can be arranged so that the corresponding (adjacent) pads on the two pad column arrays on each side can be summed to give a single signal. The pads may also be summed in four or more adjacent pads together to improve the statistics and the quality of the image with some loss in spatial resolution. One arm may also be divided into two half pieces and the 16 bit data output of the pads or summed group of pads can be combined into 32 bit words to increase data throughput. Similarly the arm may be divided into three or more sections and the data can be combined into 48 or more bits of information.

Modular Design of the CdZnTe Sensor Array

The CdZnTe detector module may consist of four CdZnTe detector elements, detector bias lines, and eight FESA chips (or four chips if a single row of the pads will be used), and by-pass circuitry on a printed circuit board. Sixteen signal lines, one control line, five threshold reference lines, and electronic power lines may be routed to a connector on the edge of the printed circuit board (PCB). The ABIS detector system has one or more arms in either or both x and y directions. Eight CdZnTe detector modules form a 102.4 cm pixel array for each arm, which have two rows of 1,024 pixels. Larger detector arms may also be built. The concept and a partial detector system assembly is shown in FIG. 4.

FIG. 4 shows each arm of the detector system mounted individually in an aluminum enclosure. A thin window at the x-ray entrance is used to reduce photon absorption. Possible radiation shielding may be considered to protect the front-end electronics. The system can be modified and optimized for application to a tomographic scanner system for explosive detection. A major change will be four detector arms in the form of a square instead of two arms in the form of L. Other geometries for the detector arms may also be used. These detector arms may be straight or curved around the conveyor belt carrying the object under investigation. These detector arms may also be positioned in the form of a spiral or a double helix where the detectors lie on one helix and the x-ray sources on the opposite helix. The helical formation may be especially useful for fast scanning for high throughput.

Automatic Baggage Inspection Detector System

Two or more detector arms from 0.5 to 2 m long can be placed around a conveyer belt or any other system in the form of a square, circular, spiral or helix where an object to be imaged can be passed through with a constant speed. The detector arms may or may not be placed coplanar so that each arm can be illuminated by a single or multiple x-ray sources with or without overlapping with another detector arm. The single or multiple x-ray sources placed at regular intervals facing a detector arm can be placed stationary or may move up and down or side to side or a combination of the two to produce tomographic images. The two arm version of the detector is shown in FIG. 4.

X-ray Source and Detector System Integration

The x-ray source and sensor system can be integrated into the scanner system with conveyer belt. A collimator for the x-ray sources may reduce background scattered radiation and will enhance the image quality.

Tests Carried Out on Automatic Substance Identification

Figure 16:
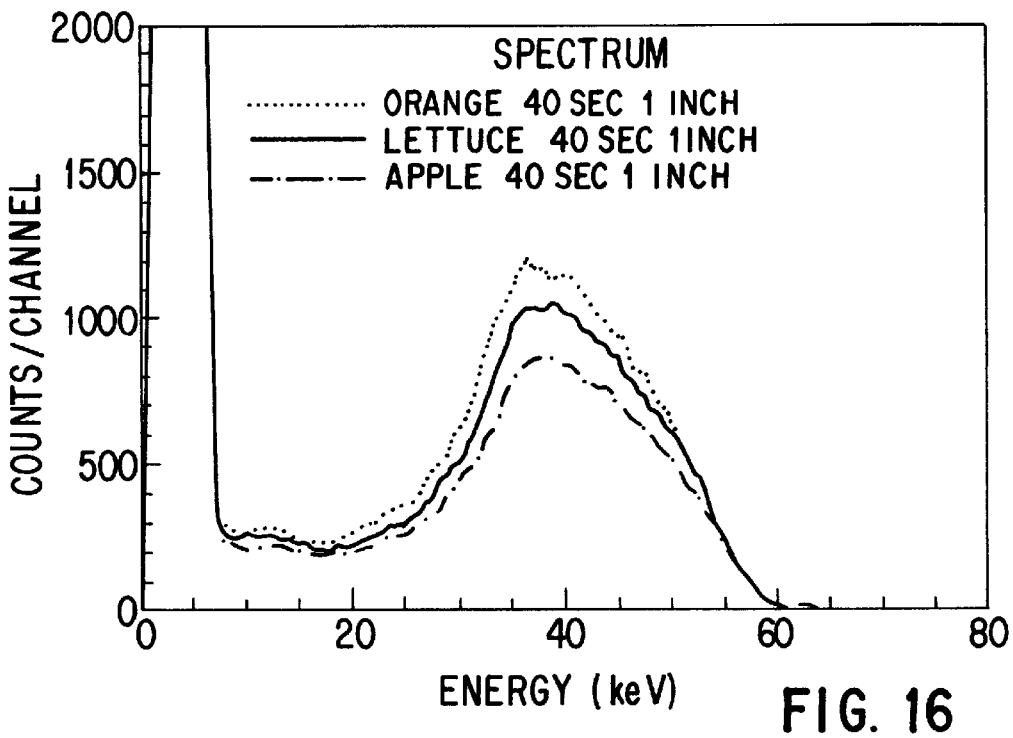
FIG. 16 Shows x-ray spectra for 1" thick apple, orange and lettuce samples using a CZT detector.

A 60 to 70 kV x-ray system was used to investigate the x-ray spectrum for different objects, including agricultural products to see if it is possible to distinguish between them by using the energy spectra. This x-ray system emits continuous x-ray radiation up to 70 keV. A two inch thick lead brick with 3 mm collimator was used in front of the window of the x-ray tube head. The collimator reduces the radiation rate to accommodate the speed of the electronics currently in use. A hand held control unit (HHCU) controls the exposure time which can be chosen from 0.01 seconds to 2 seconds. The x-ray tube head, collimator, and detector were aligned using a laser device. The same electronics used in the tests with radioactive source were used in the x-ray tests. Several agricultural products were examined using the x-ray system. The samples, including an apple, an orange and lettuce, were cut into the same thickness (1 inch). The same exposure time was used for each sample. The differences obtained can be noticed from the preliminary spectra shown in FIG. 16.

Figure 17:
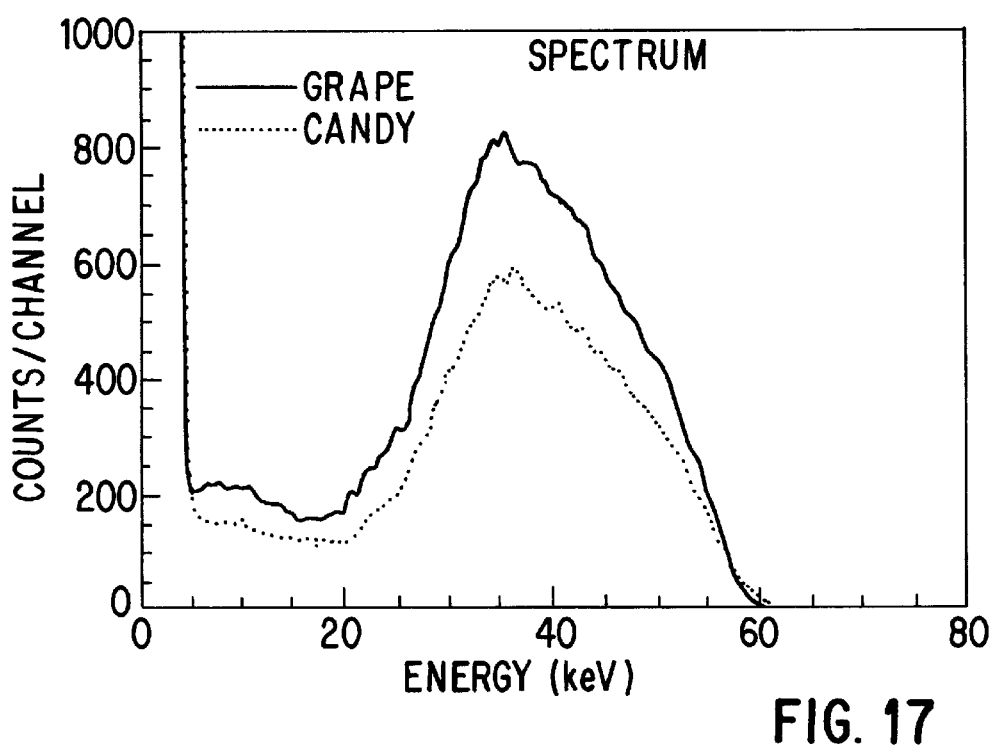
FIG. 17 Shows x-ray spectra for grape/candy using a CZT detector.

Another experiment was performed to investigate the spectroscopic difference aimed at distinguishing the "candy and fruit look alike". A fresh ripe seedless grape was used in the test. Candy was chosen with the same size as the grape. The ingredients of the candy included sugar, corn syrup, vegetable oil, cocoa powder, salt, whey and artificial flavor. The spectra are shown in FIG. 17. The differences demonstrated in the x-ray spectra for different objects may be used to identify these objects.

Design of ABIS Module

As shown in FIG. 18 one ABIS Module PCB will host four CdZnTe detector elements 49 with a total of 2×128 pixels, eight FESA readout chips 50 on hybrid carriers, and some support circuitry 51. Three connectors will be used on the ABIS module PCB: one connector is for the data output and the control signals; the second is for the power supplies and voltage references, and both of these are connected in parallel to all active ABIS modules; and the third one is for the readout shift register of the FESA chips, and has a daisy-chain topology. Other or different connectors are expected to be used with the new improved FESA II chip.

The ABIS module boards are connected to an Interface Board 52. The Interface Board is connected to the control computer 53. Control computer also displays the acquired image.

Image Acquisition

A data acquisition and imaging software was written in C++ for handling the data acquisition, image display and some image processing. The image processing portion of the software included background subtraction and gain correction. Images are acquired in the following way using the scanner system discussed above:

1. A scan was taken with no object and no x-rays for background subtraction.

2. The x-ray s were turned on and another scan was taken with no object. This scan was used for gain corrections. A "good channel" was preselected and all other channels were then normalized to the "good channel."

3. The object of interest was placed on the conveyor and another scan was taken while the object passes between the x-ray source and the CZT detectors. The data was taken at fixed time intervals selected from the data acquisition software running on the host computer.

4. At the end of the scan the image could be displayed in its raw form. In this form no correction is performed. Then the image could be processed to correct for the background and gain. The resultant images in each energy band can be viewed one at a time or all together on the computer screen.

5. The image data was then saved in ASCII format on disk and processed further using an image processing software. A color scheme can be selected to vary with the dynamic range of the image relative to the color scheme. The images can also be enhanced further by adjusting the contrast and brightness using the software. Other image enhancements techniques may also be applied as required.

The ABIS module boards are located inside the luggage scanner system.

Imaging with a 90 kV X-Ray Generator

Figure 19:
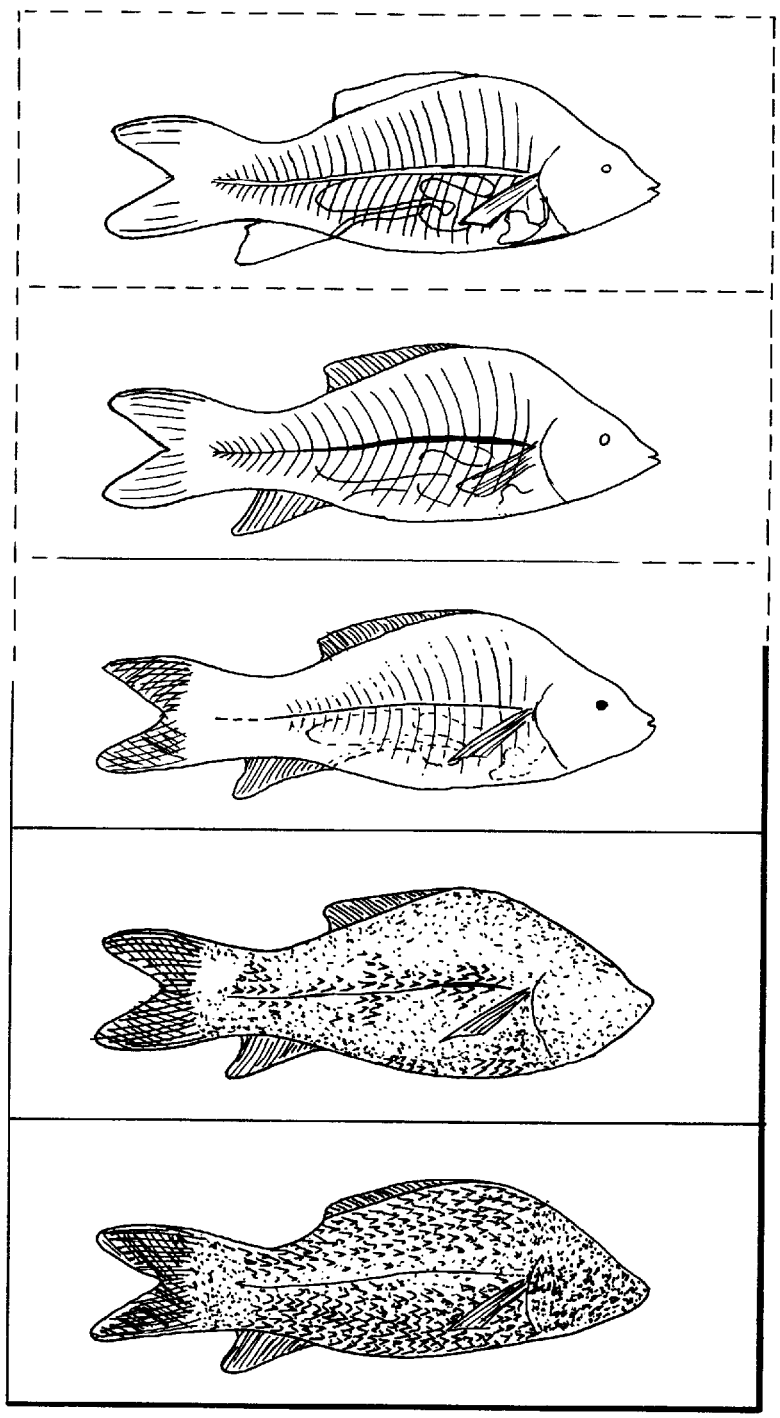
FIG. 19 Shows images of a fish that was about 25 cm long from head to tail. Images for all five energy spectrum bands are shown.

Preliminary different energy band images of an object (fish) is shown as an example in FIG. 19. The fish was about 25 cm long from head to tail. The top image is from the highest energy band, the second from the top is from the second highest energy band and so on. In all images of the fish the side fin and tail are identifiable.

In the first three images the mouth, organ structure and bones can be seen. Even the outline of the Styrofoam tray is perceptible in the third and fourth images. The 1 mm pixel size is slightly visible. Many other images of all types of single or a combination objects have been taken.

Figure 20:
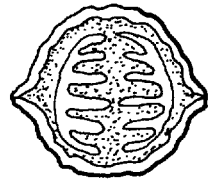
FIG. 20 Shows a tomographic cross section (1 mm wide slice) of a walnut for one energy band. The outline of the shell and the structure of the walnut can be clearly seen.

Besides acquiring images in the normal scan mode, a few objects were rotated inside the fan x-ray beam so that tomographic images could be produced. A simple manually operated stage for rotating the object manually was constructed and used. In the case of the tomographic images the PC acquired a sinogram image. The sinogram image data was then transported to a computer and the image analysis software was used to perform a back projection on the sinogram which produced a tomographic image. The resultant tomographic cross section (1 mm wide slice) of a walnut is shown in FIG. 20. The outline of the shell and the structure of the walnut can be clearly seen.

Multispectral (Energy Resolved) Imaging

The detector sensor system described has the capability to produce multispectral (energy resolved or spectroscopic) two-dimensional and three-dimensional imaging and tomography. This means that images and tomography can be produced for different x-ray energies or bands of energies. For example, 5 images are produced, each one for a different energy band. Therefore, one can produce images or tomography with "true colors" just like the eye and optical images. In "pseudo color" imaging a color is assigned to the number of counts or the intensity level of the signal received. For example, the colors can range from blue at 0 counts to red at 50,000 counts. In such a representation the color is not dependent on the energy of the observed photon but how many photons are observed in that pixel. In optics colors are directly related to the energy of the photon where the lowest energy photon produces the color red and the highest violet. The multispectral imaging detector system described here which has energy determination capability can produce images depending on the energy spectrum of the photons detected just like an optical image. This produces a "true color" image similar to an eye. Such extra information obtained from energy measurement is expected to enhance the information content and lead to the identification of substances imaged.

Position Sensitive Energy Resolving Spectroscopic ENDON Detector Array

The ENDON detector is made of a high purity solid state material that absorbs or scatters x-ray photons by either photoelectric absorption or Compton scattering. A concept drawing of a single detector module is shown in FIG. 3. The detector 44 is formed from a two dimensional array of pixels or pads 45 (definition for pixels: <1 mm² area and pads: ≧1 mm² area) usually fabricated onto the largest area side of the detector substrate. The pixels or pads nearer to the incident x-ray photons 46 observe the lower energy photons. However, the facing largest area sides of the detector can be pixelated or one of the largest area side can be made into a large conductive layer for application of the bias voltage. The substrate 47 can be made of any highly pure direct conversion material such as CdTe, CdZnTe, Selenium, $PbI_2$, GaAs, AlGaAs, InGaAs, HgBrI, $HgI_2$, GaAs and silicon. An optional guard ring 48 may be used if necessary. The pixels or pads can have different sizes as necessary for defining the energy band ranges. The x-rays are incident normal (at right angle) to one of the narrow sides. The nearer the pixel or pad 45 to the direction of the incident x-rays 46, the lower in energy the x-ray energy band observed from that pixel or pad.

The detector can be made in any required thickness for the specific application. For example a 1 mm thick detector with 1 mm pixel pitch produces images with 1 mm² pixels. Similar detector modules can be placed edge-to-edge to form long linear pixel or pad arrays for scanning type applications. The detectors can also be put side-by-side (large surfaces next to each other) to form dual, triple, quadruple, etc. rows of pixels for increasing the image speed, data rate, statistics, etc.

The energy band observed is determined by the depth of the position of the pixel or pad with respect to the side of the detectors where the x-rays are incident. The low energy x-rays are absorbed readily at shallow depths and the higher energy x-ray photons penetrate deeper into the substrate. Therefore, the number of pulses or the charge current observed at a pixel or pad produced by the electrons or holes created by the x-ray photons are proportional to the number of x-ray photons interacting at that depth. Once the depth and the material is known the average energy of the photons that interact at that depth can be determined using $$I=(1-e^{-\mu(E)d})$$

because the linear attenuation coefficient $\mu(E)$ is a function of the energy of the photon. In this equation I is the number of absorbed photons and d is the absorber thickness. The x-ray photons can also be characterized by their mean free path L (defined as the average distance traveled in the absorber before an interaction takes place), which is given by $$L=1/\mu(E).$$

Mean free path also depends on the energy of the photon and longer for larger the energy. Therefore, it is straight forward to calculate the pixel or pad lengths and the number in each column depending on the energy band ranges required for the specific application if $\mu(E)$ is known. There are also Monte Carlo programs available such as the MCNP program from Los Alamos National Laboratory, U.S. Department of Energy that can be used to simulate and optimize the detector geometry.

The ENDON Data Acquisition System

Figure 5:
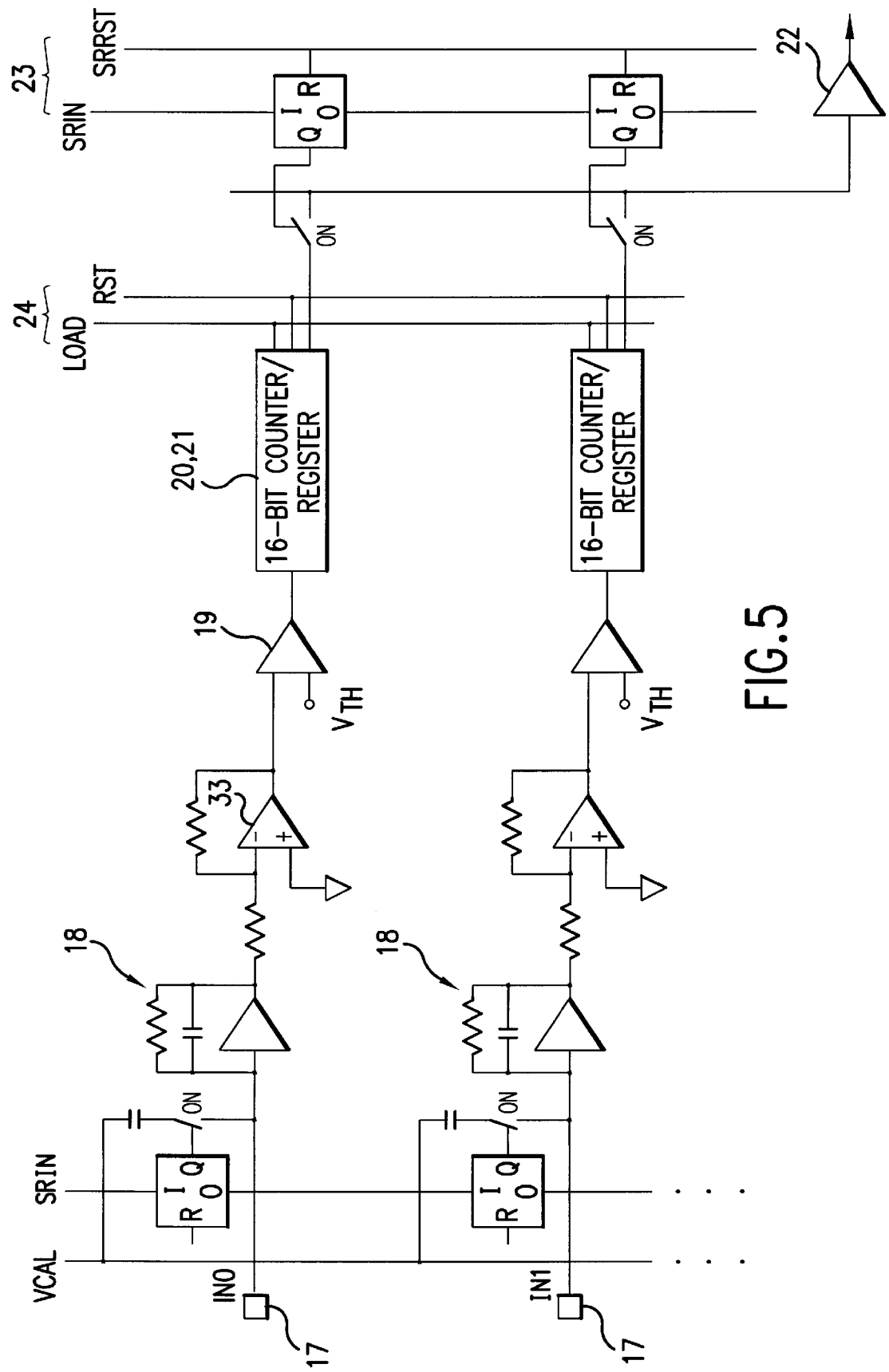
FIG. 5 Shows a different version of a FESA chip's analog and digital functions for an "ENDON" detector array.

The pixels or the pads on the detector can be routed to the bottom or the sides (with respect to the side of the detector where the x-rays are incident considered as the top side) of the detector substrate by thin conductive traces fabricated onto the detector substrate. The pulse counting type FESA or FESA II chips of FIGS. 2 and 12, respectively, can be used to read out these detectors in the pulse counting mode. However, in this case, the number of channels having pulse shapers and amplifiers is the same as the number of comparators for each pad or pixel and there are no extra level comparators needed because intensity level is now determined by the depth of x-ray penetration. FIG. 5 shows a chip circuit which has been modified for this application. The digital readout circuit running in the pulse count mode will be limited by the x-ray photon rate it can handle depending on the width of the shaped pulse per event.

To handle very high x-ray photon rates a current mode ASIC chip can be used. For measuring the charge current a different multi channel ASIC readout chip may be used to measure the electron or hole current generated by the x-ray photons interacting inside the detector substrate. The FESA chip (FIGS. 2 and 5) may be modified into a current mode readout chip by taking out the comparators 19, counters 20 and registers 21 and increasing the integration time. In this embodiment the amplifiers 18 and 33 will be modified and the output of the amplifier 33 will go directly to the chip output through a shift register or other means or to an ADC circuit to convert the output directly to a digital number. The output of a channel from the modified ASIC chip corresponding to a single pixel or pad is an analog or digital signal directly proportional to the number of x-ray photons interact at the depth of that pixel or pad inside the detector substrate.

The detectors with the readout ASIC chips can be lined up into a linear array and can be used to scan and image an object by recording the variation of the output of each channel corresponding to a pixel or pad proportional to the charge generated by x-rays that reach the detector without scattering inside the object.

The different rows of pixels or pads at different depths from the direction of the incident x-rays produce signal for different energy bands. Therefore, spectroscopic images of an object can be obtained for different x-ray energies. The spectral information obtained from images from different energy bands can be used to determine the identity of materials inside the object imaged such as explosives, money, drugs or agricultural products inside a baggage.

The detectors can be fabricated with the edge the x-rays incident on and also the pads or pixels in the form of an arc with radius equal to the distance from the x-ray source focal spot to the detector edge to eliminated depth effect if a fan beam is used (FIG. 6a). Or the individual straight pad or pixel detectors can be mounted inclined towards the x-ray beam direction such that the photons incident at the center of the detector edge are normal to the detector edge (FIG. 6b). In this geometry the length of the detector edge where the x-rays are incident on must be long enough that the photons entering near the corners do not miss most of the pixels at the deepest penetration depths possible. The depth effect is demonstrated in FIG. 6c. Other geometries may also be used.

Each pixel or pad can be connected to the input of a mixed signal ASIC readout chip. The ASIC chip can have many channels ranging from 8 to 256 channels depending on the application and pixel or pad sizes. The modified ASIC chip of FIG. 5 has the following functionality:

1. It is a mixed signal ASIC readout chip similar to the ASIC chips shown in of FIGS. 2 and 5 but working in the current mode.

2. It integrates input charge from a pixel or pad into an electric current or voltage signal.

3. It stores this signal if necessary.

4. It multiplexes signals from different channels to a single or multiple outputs.

5. It converts current signals to voltage before connecting them to the output if necessary.

6. It digitizes the signals with analog to digital converter (s) (ADC), multiplex and connect the digital number corresponding to the signal level to the output.

7. A selectable internal or external clock signal is used to run the digital control circuitry that can sequence the multiplexing circuits and data output rate. It times the data acquisition. It can also control the ADC(s).

8. The chip also has provision to accept either positive or negative charge input.

9. The chip also has provision to turn any channel on or off in case any channel becomes noisy or not used.

10. The amplifier offset and gain variations from channel to channel can be compensated by digital to analog converters (DACS) placed at each relevant amplifier.

11. There is a test input to each channel for testing the modified ASIC chip without need to connect the inputs to a detector or signal generator individually. Extra test channels may be placed one at the top and one at the bottom of the column of channels.

12. There can also be other external signals in addition to channel and test inputs to control the current mode modified ASIC chip such as to cause it to start, input level (negative or positive charge) select, step, switch between different outputs, change readout or function modes, set different integration times, set channels to on or off individually, set DAC levels for each amplifier adjustment, stop, reset and any other signals that may be necessary for controlling the chip.

13. The modified ASIC chip can also generate control signals other than the analog and/or digital signal output such as chip ready, channel change acknowledge, data ready, channel address (if necessary), and readout complete as well as any other necessary control signals for control of the chip and daisy chaining.

14. The modified ASIC chip is made daisy chainable such that several chip outputs can be connected to one bus and read out serially.

What is claimed is:

1. A radiation imaging apparatus comprising in combination:

a source of radiation;

a plurality of radiation detectors wherein each detector has an output which comprises at least three threshold data wherein each threshold data is a representative of a different radiation energy level received;

a display means responsive to said plurality of radiation detectors for different threshold data for producing one or more images;

wherein said display means includes a computer for controlling data acquisition, data analysis, and image production and display and further comprising means for adjusting threshold data levels to compensate for differences in output of different X-ray detectors.

2. The apparatus in accordance with claim 1 wherein said source of radiation is at least two point sources of radiation.

3. The apparatus in accordance with claim 2 wherein said apparatus incorporates means for switching between said sources of radiation to radiate the said object at different angles, wherein a three dimensional or tomographic X-ray image is obtained after processing of threshold data by said display means.

4. The apparatus in accordance with claim 1 wherein each detector has a plurality of detector pads for producing output pulses wherein each pulse is proportional to a quantum of radiation; and wherein said detector pads are arranged to form a two-dimensional array of pads which comprise a detector.

5. The apparatus in accordance with claim 1 wherein said plurality of said radiation detectors include detector pads or strips.

6. The apparatus in accordance with claim 1 further comprising a means for turning said radiation source on and off for controlling of scan time.

7. The apparatus in accordance with claim 1 further comprising detector long arms which are placed surrounding a conveyer belt upon which an object to be detected is carried.

8. The apparatus in accordance with claim 7 further comprising point-X-Ray or radiation sources separated at regular or irregular distances from each other and placed opposite to said X-ray detector arms to produce complete coverage of the object and to generate a three dimensional or tomographic image.

9. The apparatus in accordance with claim 5 wherein pads or strips which are closest to the direction of the incident radiation and X-ray photons observe lower energy band photons.

10. The apparatus in accordance with claim 4 wherein the pads have different locations for defining energy band ranges.

11. The apparatus in accordance with claim 4 wherein a linear pad array of one or more rows of pads are provided in a position wherein said radiation is incident to a side of the pads.

12. The apparatus in accordance with claim 1 wherein there are a plurality of rows of pixels or strips with X-rays or radiation incident onto the side adjacent to the pixels or strips, wherein an ENDON detector is provided.

13. The apparatus in accordance with claim 1 wherein said detector is a current type Endon detector with multi-spectral imaging where radiation or X-rays are incident to an edge or side.

14. The apparatus in accordance with claim 4, wherein the data readout can be arranged so that the corresponding pads on two or more pad column arrays can be summed to give a higher statistically significant signal.

15. The apparatus in accordance with claim 7 wherein said arms are in the form of a square, circular, spiral or helix shape.

16. The apparatus in accordance with claim 1 wherein said data is comprised of energy of each detected X-rays photon.

17. The apparatus in accordance with claim 1 wherein said radiation source produces radiation comprised of one or more energy bands at different times.

18. The apparatus in accordance with claim 1 wherein there are two or more filters between the radiation source and the detectors to produce three or more energy bands.

19. The apparatus in accordance with claim 4 wherein the detector pads are at different angles to the incident radiation direction.

20. The apparatus in accordance with claim 1 further comprising means for turning on different radiation source energies in sequence.

21. The apparatus in accordance with claim 1 further comprising a means for switching radiation source from one energy band to another.

22. The apparatus in accordance with claim 19 wherein pads or strips further away from the incident radiation observe higher energy band photons.

23. The apparatus in accordance with claim 1 comprising means for measuring energy of each radiation photon.

24. The apparatus in accordance with claim 1 wherein the radiation detectors are made from a material selected from the group consisting of Silicon, CdTe, CdZnTe, GaAs, Germanium, $HgI_2$, $PbI_2$ and Selenium.

25. A radiation imaging apparatus comprising in combination:
   a source of radiation;
   a plurality of radiation detectors wherein each detector has an output which comprises at least three threshold data wherein each threshold data is a representative of a different radiation energy level received;
   a display means responsive to said plurality of radiation detectors for different threshold data for producing one or more images;
   wherein said display means includes a computer for controlling data acquisition, data analysis, and image production and display; and
   wherein said apparatus comprises at least one application specific integrated circuit (ASIC).

26. The apparatus in accordance with claim 25 wherein said source of radiation is at least two point sources of radiation.

27. The apparatus in accordance with claim 25 wherein said apparatus incorporates means for switching between sources of radiation to radiate the said object at different angles, wherein a three dimensional or tomographic X-ray image is obtained after processing of threshold data by said display means.

28. The apparatus in accordance with claim 25 wherein each detector has a plurality of detector pads for producing output pulses wherein each pulse is proportional to a quantum of radiation; and
   wherein said detector pads are arranged to form a two-dimensional array of pads which comprise a detector.

29. The apparatus in accordance with claim 25 wherein there are a plurality of radiation detector pads or strips.

30. The apparatus in accordance with claim 25 further comprising a means for turning said radiation source on and off for controlling of scan time.

31. The apparatus in accordance with claim 25 further comprising detector long arms which are placed surrounding a conveyer belt upon which an object to be detected is carried.

32. The apparatus in accordance with claim 31 further comprising point-X-Ray or radiation sources separated at regular or irregular distances from each other and placed opposite to said X-ray detector arms to produce complete coverage of the object and to generate a three dimensional or tomographic image.

33. The apparatus in accordance with claim 25 further comprising means for adjusting threshold data levels to compensate for differences in output of different X-ray detectors.

34. The apparatus in accordance with claim 25 further comprising a means for switching from one radiation source to another.

35. The apparatus in accordance with claim 28 wherein pads or strips which are closest to the direction of the incident radiation and X-ray photons observe lower energy band photons.

36. The apparatus in accordance with claim 28 wherein the pads have different locations for defining energy band ranges.

37. The apparatus in accordance with claim 28 wherein a linear pad array of one or more rows of pads are provided in a position wherein said radiation is incident to a side of the pads.

38. The apparatus in accordance with claim 25 wherein there are a plurality of rows of pixels or strips with X-rays or radiation incident onto the side adjacent to the pixels or strips, wherein an ENDON detector is provided.

39. The apparatus in accordance with claim 25 wherein said detector is a current type Endon detector with multi-spectral imaging where radiation or X-rays are incident to an edge or side.

40. The apparatus in accordance with claim 25 wherein said data is comprised of energy of each detected X-rays photon.

41. The apparatus in accordance with claim 25 wherein said radiation source produces radiation comprised of one or more energy bands at different times.

42. The apparatus in accordance with claim 25 wherein there are two or more filters between the radiation source and the detectors to produce three or more energy bands.

43. The apparatus in accordance with claim 28 wherein the detector pads are at different angles to the incident radiation direction.

44. The apparatus in accordance with claim 25 further comprising means for turning on different radiation source energies in sequence.

45. The apparatus in accordance with claim 25 further comprising a means for switching radiation source from one energy band to another.

46. The apparatus in accordance with claim 43 wherein pads or strips further away from the incident radiation observe higher energy band photons.

47. The apparatus in accordance with claim 25 comprising means for measuring energy of each radiation photon.

48. The apparatus in accordance with claim 37 wherein the data readout can be arranged so that the corresponding pads on two or more pad column arrays can be summed to give a higher statistically significant signal.

49. The apparatus in accordance with claim 31 wherein said arms are in the form of a square, circular, spiral or helix shape.

50. The apparatus in accordance with claim 25 wherein the radiation detectors are made from a material selected from the group consisting of Silicon, CdTe, CdZnTe, GaAs, Germanium, $HgI_2$, $PbI_2$ and Selenium.

51. The apparatus in accordance with claim 1 further comprising a means for switching from one radiation source to another.

* * * * *